(12) United States Patent
Hui et al.

(10) Patent No.: US 9,370,009 B2
(45) Date of Patent: *Jun. 14, 2016

(54) BASE STATION WITH COORDINATED MULTIPLE AIR-INTERFACE OPERATIONS

(71) Applicant: AirHop Communications, Inc., San Diego, CA (US)

(72) Inventors: Yan Hui, San Diego, CA (US); Edwin Park, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/014,972

(22) Filed: Aug. 30, 2013

(65) Prior Publication Data

US 2014/0066083 A1 Mar. 6, 2014

Related U.S. Application Data

(63) Continuation of application No. 13/609,819, filed on Sep. 11, 2012, now Pat. No. 8,548,521, which is a continuation of application No. 12/653,736, filed on Dec. 16, 2009, now Pat. No. 8,295,877.

(60) Provisional application No. 61/138,453, filed on Dec. 17, 2008.

(51) Int. Cl.
*H04M 1/00* (2006.01)
*H04W 72/04* (2009.01)
(Continued)

(52) U.S. Cl.
CPC ............ *H04W 72/048* (2013.01); *H04W 88/06* (2013.01); *H04W 88/10* (2013.01)

(58) Field of Classification Search
CPC ...................................................... H04W 88/06
USPC ......... 455/552.1, 509, 452.2, 464, 553.1, 524
See application file for complete search history.

(56) References Cited

U.S. PATENT DOCUMENTS 7,826,459 B2 * 11/2010 Xhafa et al. ............... 370/395.5
8,295,877 B2 * 10/2012 Hui et al. ................... 455/552.1
8,548,521 B2 * 10/2013 Hui ......................... H04W 88/06
370/328

*Primary Examiner* — Sanh Phu
(74) *Attorney, Agent, or Firm* — Van Pelt, Yi & James LLP

(57) ABSTRACT

Base stations with coordinated multiple air-interface operations are provided. In some embodiments, multi-mode base station (BTS) systems operate with different air-interfaces, functionality, or configurations in a coordinated manner. For example, typical applications of such systems can include Macrocell BTS, Picocell BTS, Femtocell BTS, or Access Point (AP), Set Top Box (STB), or Home Gateway, Hot Spot Devices, User Terminal with the capability to perform required base station operations. In some embodiments, various techniques are provided for system improvements and optimizations via radio resource management, including user and system throughput optimization, QoS improvement, interference management, and various other improvements and optimizations. In some embodiments, a system (e.g., a multi-mode device, such as a base station, a repeater, and/or a terminal) includes a multi-mode communication unit, in which the multi-mode communication unit allocates access for communication using at least two modes; and a processor configured to implement at least in part the multi-mode communications unit. In some embodiments, the at least two modes include one or more of the following: frequency band, protocol standard, duplexing format, broadcast mode (e.g., television broadcast and/or a radio broadcast), and one-way communication mode.

29 Claims, 14 Drawing Sheets

(51) Int. Cl.
*H04W 88/06* (2009.01)
*H04W 88/10* (2009.01)

BASE STATION WITH COORDINATED MULTIPLE AIR-INTERFACE OPERATIONS

CROSS REFERENCE TO OTHER APPLICATIONS

This application is a continuation of co-pending U.S. patent application Ser. No. 13/609,819, entitled BASE STATION WITH COORDINATED MULTIPLE AIR-INTERFACE OPERATIONS, filed Sep. 11, 2012, which claims priority U.S. patent application Ser. No. 12/653,736, now U.S. Pat. No. 8,295,877 entitled BASE STATION WITH COORDINATED MULTIPLE AIR-INTERFACE OPERATIONS filed Dec. 16, 2009, which claims priority to U.S. Provisional Patent Application No. 61/138,453 entitled SYSTEM AND APPARATUS OF BASE STATION WITH COORDINATED MULTIPLE AIR-INTERFACE OPERATIONS filed Dec. 17, 2008, all of which are incorporated herein by reference for all purposes.

BACKGROUND OF THE INVENTION

Conventional cellular base stations (BTSs) normally operate in licensed frequencies with one air-interface standard. Multiple air-interfaces can be operated in different carrier frequencies from the same or different cell sites. User Equipments (UEs) can normally handoff from one BTS to another BTS, which uses the same or different air-interfaces.

A remote station operates in either licensed frequencies or, if so desired, in unlicensed frequencies. An example of a remote station is a Femtocell, which typically operates in a licensed frequency band. A Femtocell is a smaller cellular base station or access point that operates in either licensed frequencies or, if so desired, in unlicensed frequencies. It is typically designed for use in residential or business environments. Remote stations use the available broadband access, such as DSL, cable, T1/E1, or fixed wireless broadband to access the networks. Furthermore, many remote stations, such as Femtocells, tunnel the user and control data through the broadband and connect to the cellular core network backhauls.

The Femtocell incorporates the functionality of a typical base station with a simpler, self contained deployment. For example, a typical UMTS Femtocell includes a Node B and RNC with Ethernet for backhaul. Although much attention is focused on UMTS, the concept is applicable to all standards, including GSM, EDGE, GPRS, LTE, CDMA, CDMA2000, TD-CDMA and WiMAX solutions. A Femtocell system can also include a router that also includes other Ethernet based items and a Wi-Fi connection.

A Set Top Box (STB) or set top unit (STU) is a device connecting the television to an external source of signal. Furthermore, the STB/STU converts the signal to be displayed on the television screen. Typically, STBs were used by the cable providers to decode the television signals that the cable providers transmitted. More recently, local telephone companies have started to provide television service using a STB via telephone lines or fiber. The Telecommunication Act of 1996 allowed non-cable companies to provide equipment to access the cable network. An example of this is the CableCARD. Though the deadline has been moved twice, as of Jul. 1, 2007, users of cable can now purchase the STB/STU separately from the cable service. Therefore, innovation in this area will occur outside the cable providers as well as with the cable providers.

BRIEF DESCRIPTION OF THE DRAWINGS

Various embodiments of the invention are disclosed in the following detailed description and the accompanying drawings.

DETAILED DESCRIPTION

Figure 1:
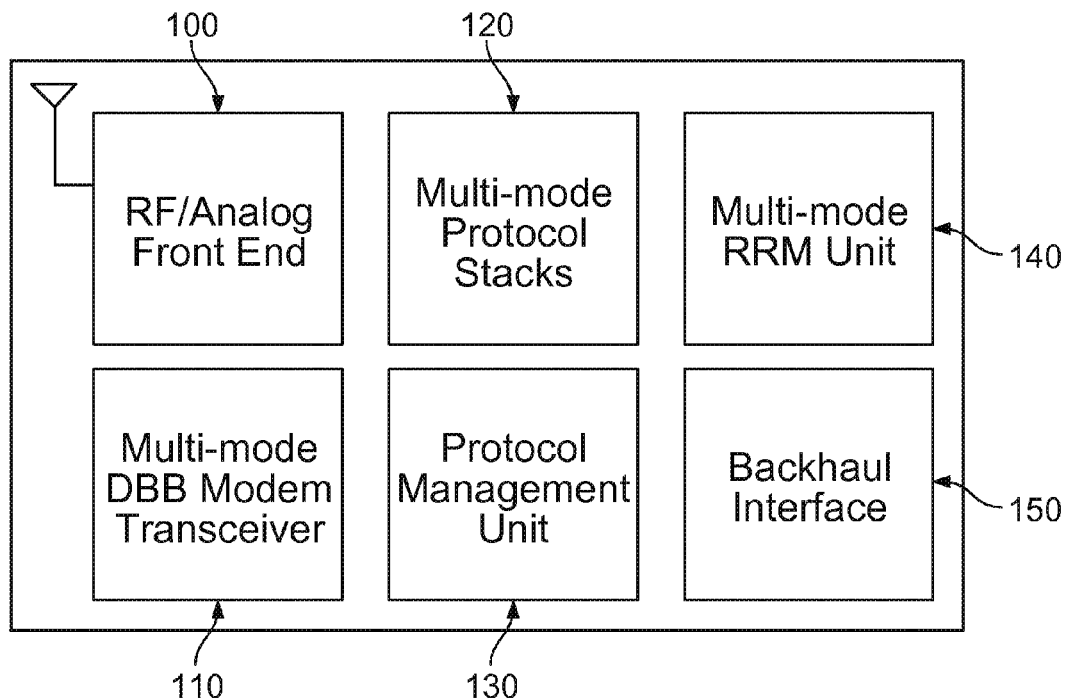
FIG. 1 is a block diagram of a multi-mode BTS in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, it is desirable to integrate multiple air-interface or functionality into one device so that a single device can provide, for example, multiple services simultaneously or otherwise. Prior approaches usually focus on integration of the multiple air-interface or functionality in a single box or a single chip in order to provide individual services with lower cost or smaller footprint due to integration. Some prior approaches address limited communications between individual air-interfaces, but they are typically on the terminal sides. For example, a possible integration would be putting the Femtocell, LAN router, Wi-Fi, and the DSL/STB in one box. Doing so would make the unit smaller, potentially cheaper and easier to maintain. However, this integration does not improve the utilization of the individual air-interfaces or the network resources, which is one of the major areas addressed by the various techniques described herein.

In some embodiments, it is also desirable for multi-tier cellular systems to operate multiple air-interfaces or the same air-interface operating on the multiple RF frequencies in a coordinated manner in order to improve the utilization of the individual air-interfaces or the network resources, which is another area addressed by the various techniques described herein.

Accordingly, in some embodiments, wireless communications, particularly related to multi-mode devices, such as Macrocell BTS, Picocell BTS, Femtocell BTS, or Access Point (AP), Set Top Box (STB), or Home Gateway, Hot Spot Devices, User terminal with the capability to perform required base station operations, with different air-interface, functionality or configurations and being operated in a coordinated manner are described herein.

Certain embodiments as disclosed herein provide for multi-mode devices or systems with different air-interface, functionality or configurations in a coordinated manner. Typical applications of such systems include, for example, Macrocell BTS, Picocell BTS, Femtocell BTS, or Access Point (AP), Set Top Box (STB), or Home Gateway, Hot Spot Devices, User terminal with the capability to perform required base station operations. The devices and systems not only provide the same individual functionality as provided by individual mode, but also provide for improvements and optimizations via radio resource management, including, for example, user and system throughput optimization, QoS improvement, interference management, and various other improvements as described herein. For example, such improvements and optimizations include the cases in which the multimode is on the same BTS device or on more than tier of BTS devices.

While the various embodiments described herein with respect to BTS systems, such as access points or Femtocell BTSs, one of ordinary skill in the art will appreciate that, for example, the various embodiments described herein can include Macrocell BTSs, Picocell BTSs and other type of wireless stations, such as but not limited to repeaters, relay stations, User Equipments and so on. Also, even though the examples in the various embodiments described herein are generally described as using two different modes or two different frequencies or two different air-interfaces, one of ordinary skill in the art will appreciate that the embodiments described herein can be extended to more than two modes, frequencies, and/or air-interfaces.

In some embodiments, the BTS/AP system includes at least part or all of the following components:
1) One or more RF and analog baseband front end (100);
2) Digital baseband modem transceiver(s) with PHY and MAC implemented in hardware or software or both (110);
3) Digital processor with or without hardware accelerator implementing protocol stack software that can include MAC and layers above it, and supporting the all the required air-interfaces (120);
4) An protocol management unit used to coordinate the protocols of multiply air-interfaces (130);
5) A radio resource management and scheduling unit, which can be located inside or outside of the management unit, used to perform resource management and scheduling between the multiply air-interfaces (140), for example, including but not limited to the following:
   Scheduling/load balancing based on QoS, available bandwidth, interference level;
   Scheduling/load balancing based on applications, for example, real-time video vs. file download; and
   Schedule/load balance based on availability of spectrum over time or location; and
6) Hardware and software interface to backhaul (150).

For example, this approach is illustrated in FIG. 1 in accordance with some embodiments. In particular, FIG. 1 is a block diagram of a multi-mode BTS in accordance with some embodiments. As will be apparent to one of ordinary skill in the art, the above components are partitioned based on their functionality not necessarily physical implementation entity. As such, they do not have to be separate entities in the FIG. 1 implementation.

In some embodiments, the BTS/AP system with the components described in the previous embodiments supports cellular air-interface(s) on two or more different frequency bands with at least one being licensed band and at least one in unlicensed band. The operations in the multiple frequency bands are coordinated based on the embodiments described below for the purpose of improving the performance. An example of such multi-mode systems is shown in FIG. 2 in accordance with some embodiments.

Figure 2:
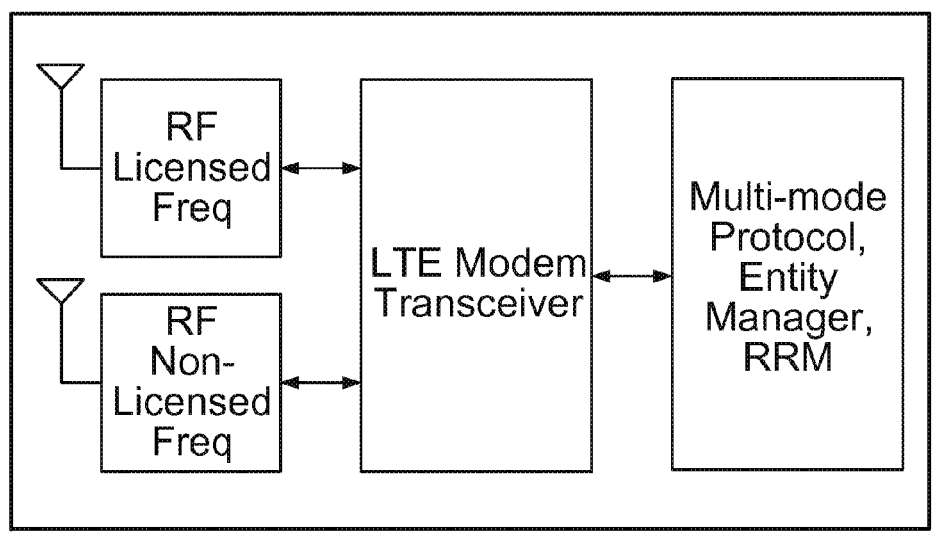
FIG. 2 illustrates a cellular base station that operates in both licensed and unlicensed bands in accordance with some embodiments.

FIG. 2 illustrates a cellular base station that operates in both licensed and unlicensed bands in accordance with some embodiments. In some embodiments, the same cellular air-interface operates in both licensed and unlicensed hands from the same BTS.

In some embodiments, the scheduling algorithm (e.g., implemented using a scheduling function, such as a proportional fairness, round robin, or maximum throughput (also known maximum C/I) function) in the radio resource management unit can still be derived by optimizing the sum of the utility functions of each individual user in each the frequency band separately. However, due to the fact that there are single mode UE devices as well as dual-mode or multi-mode UE devices, a more efficient RRM algorithm as described herein can be used to take advantage of the multi-mode operations and multi-mode UE devices. For example, this approach is illustrated in FIG. 2.

In some embodiments, the radio resource management (RRM) algorithm can be derived by optimizing the sum of the utility functions of each individual UE across all the frequency bands in following way(s):

1) The RRM reserves a proper portion of the radio resources in each of the frequency bands, for example, code space in the CDMA case or resource elements on time-frequency plane in the OFDM case, in order to schedule the single mode users. The allocated radio resource for the single mode users can be dynamically adjusted based on the change of requirements, such as QoS and number of users, and/or other requirements.

2) The scheduling algorithm schedules the users in the appropriate frequency band, which only support single air-interface mode, to the reserved resources. For example, this can be formulated as an optimization problem to allocation radio resources in each of the frequency band for all the single-mode users in that the appropriate band to individually maximize $$\frac{1}{M_j} \sum_{i=1}^{M_j} U_i^1(r_i) \quad j = 1, \ldots, N$$

where $r_i$ is the instantaneous data rate of user i, $H_i^1(\cdot)$ is the corresponding utility function of user i, $M_j$ is number of single-mode users in frequency band j, and N is total number of frequency bands.

3) After the single mode users are scheduled, the scheduling algorithm schedules the users who support multiple frequency bands to the appropriate frequency band by treating all the bands as one band (e.g., the same utility function is applied to all the modes of each user). For example, this can be formulated as an optimization problem below:

$$\max_x \frac{1}{K} \sum_{j=1}^{K} \left( \frac{1}{M_j} \sum_{i=1}^{M_j} U_i^2(r_{ij}x_{ij}) \right), \text{ subject to } \sum_{j=1}^{K} \left( \sum_{i=1}^{M_j} x_{ij} \right) = 1, x_{ij} \in \{0, 1\}$$

where $r_{ij}$ is the instantaneous data rate of user i in frequency band j, $U_i^2(\cdot)$ is the corresponding utility function of user i in any frequency band, $M_j$ is number of multi-mode users in frequency band j, and K is total number of frequency bands. $x_{ij}$ is defined as $$x_{ij} = \begin{cases} 1, & \text{if radio resource in frequency } j \text{ is assigned to user } i \\ 0, & \text{otherwise} \end{cases}.$$

The last condition is to ensure that each multi-mode user will only be assigned to one frequency (or mode) at any given time. In the case, that multi-mode UEs can simultaneously support multiple frequencies, $x_{ij}$ can be dropped.

In some embodiments, the radio resource management procedure of step 3) of the above described embodiment can be done in one of the following ways:

a) After the single mode users are scheduled, the scheduling algorithm schedules the users which support multiple frequency modes by treating different frequency bands with different priority (e.g., different utility functions are used for different frequency band modes for a multi-mode UE). One example would be to use utility functions that favors better channel condition(s) on the non-licensed band mode but use utility functions with proportional fairness on the licensed band mode. For example, the scheduling can be resolved as an optimization problem, and the objective is to allocate radio resources to maximize the sum of the utility functions of all the users across all the frequency bands, which can be described as follows:

$$\max_x \frac{1}{K} \sum_{j=1}^{K} \left( \frac{1}{M_j} \sum_{i=1}^{M_j} U_{ij}^2(r_{ij}x_{ij}) \right), \text{ subject to } \sum_{j=1}^{K} \left( \sum_{i=1}^{M_j} x_{ij} \right) = 1, x_{ij} \in \{0, 1\}$$

where $r_{ij}$ is the instantaneous data rate of user i in frequency band j, $U_{ij}^2(\cdot)$ is the corresponding utility function of user i in the frequency band j, $M_j$ is number of multi-mode users in frequency band j, and K is total number of frequency bands. $x_{ij}$ is defined as $$x_{ij} = \begin{cases} 1, & \text{if radio resource in frequency } j \text{ is assigned to user } i \\ 0, & \text{otherwise} \end{cases}.$$

The last condition is to ensure that each multi-mode user will only be assigned to one frequency (e.g., mode) at any given time. In the case that multi-mode UEs can simultaneously support multiple frequencies, $x_{ij}$ can be dropped.

b) The RRM reserves a proper portion of the radio resources (e.g., dedicated resources) in each of the frequency band, for example, code space in CDMA case or resource elements on time-frequency plane in OFDM case, in order to schedule the higher priority multi-mode UEs. After the single mode users are scheduled, the scheduling algorithm schedules UEs who support multiple frequency band modes and which has priority level higher than pre-determined threshold to the dedicated resources. The scheduling is then done to the remaining UEs. In both dedicated resource scheduling as well as the remaining resource scheduling, the scheduling can still be treated an optimization problem and it can either based on step a) in this embodiment or step 3) in the previous embodiment.

By doing so, it can properly manage QoS requirements by taking advantage of licensed band and non-licensed band operations.

In some embodiments, the BTS/AP system supports more than one air-interface standards in the same carrier frequency with the same bandwidth or different bandwidth with complete or partial frequency overlap, or in different carrier frequencies with the same bandwidth or different bandwidth but with certain overlap in frequency bands.

Figure 3:
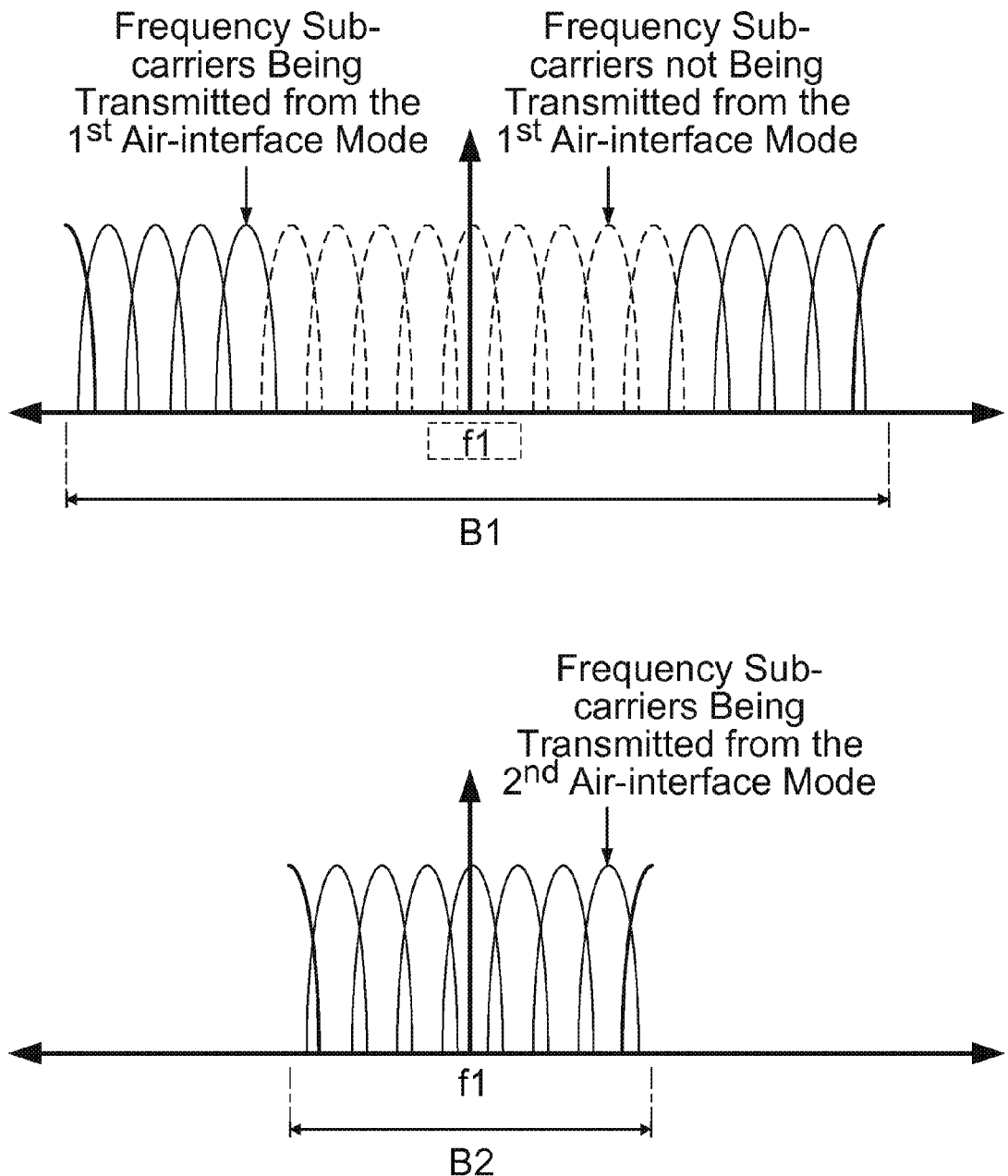
FIG. 3 illustrates two OFDM based air-interfaces that operate with frequency band being overlapped in accordance with some embodiments.

In some embodiments, two OFDM based air-interfaces operate with carrier frequency bands being overlapped. For example, a dual-mode LTE and WiMax BTS/AP system, in which LTE operates at carrier frequency $f_1$ with bandwidth of $B_1$ and WiMax operates at carrier frequency $f_2$ with bandwidth of $B_2$. $B_2$ can be equal to, smaller or larger than $B_1$. The scheduler and resource management will coordinate the radio resources assignment in terms of subcarriers assignment such that overlapped subcarriers from one of the air-interface will not be assigned any data by the other air-interface or assigned with the power level with acceptable interferences to the first air-interface. For example, this approach is illustrated in FIG. 3 in accordance with some embodiments. In particular, FIG. 3 illustrates two OFDM based air-interfaces that operate with frequency band being overlapped in accordance with some embodiments.

For example, assuming $B_2$ =5MHz, $B_1$ =10MHz, the BTS/AP system can use one RF front end with bandwidth of 10 MHz for transmitting. In digital baseband, the subcarriers in frequency domain belongs to $B_1$ that overlaps with $B_2$ will not be assigned any data for LTE air-interface so that WiMax air-interface will assign data to the $B_2$ =5MHz band. It should be noted that bandwidth assignment can be static, semi-static, or dynamic with real-time assignment down to smallest resource element. For example, this approach is illustrated in FIG. 4 in accordance with some embodiments.

Figure 4:
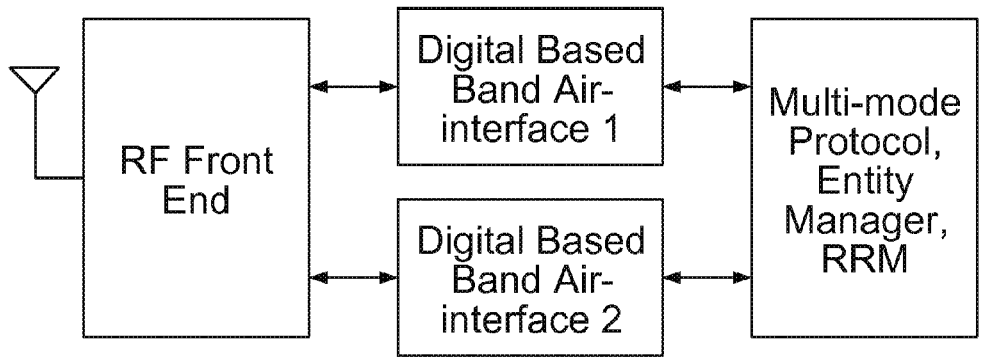
FIG. 4 illustrates a multi-mode BTS using the same RF front end and RRM coordinates the multi-mode transmission with frequency band being overlapped in accordance with some embodiments.
Figure 4:
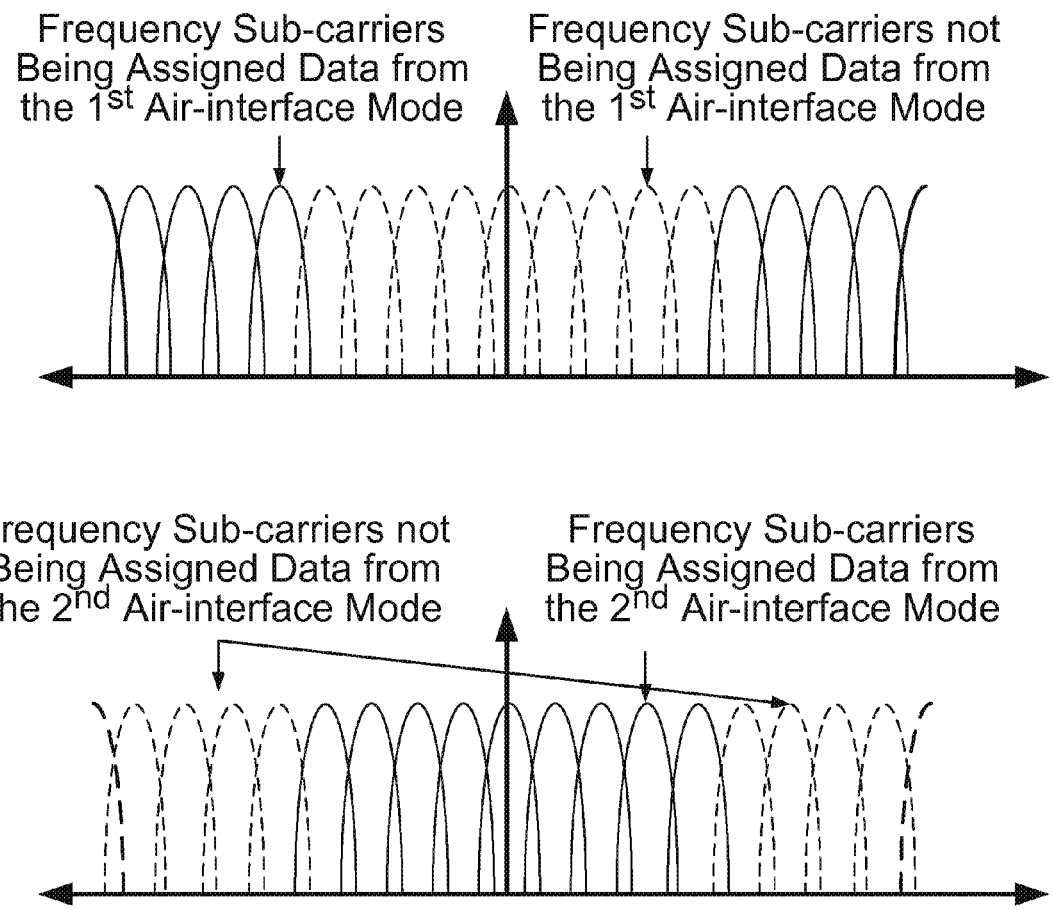

FIG. 4 illustrates a multi-mode BTS using the same RF front end and RRM coordinates the multi-mode transmission with frequency band being overlapped in accordance with some embodiments. In some embodiments, the assignment of the subcarriers does not need to be continuous. For example, this can also be easily extended to more than two air-interface cases. As will be apparent to one of ordinary skill in the art, even though the example shown LTE and WiMax dual-mode, it can be easily extended to other modes (e.g., LTE/WiFi, WiMax/WiFi).

In some embodiments, an OFDM based air-interface operates with non-OFDM based air-interface with frequencies being overlapped. For example, a dual-mode LTE and 3G UMTS BTS/AP systems, in which LTE operates at carrier frequency $f_1$ with bandwidth of $B_1$ and 3G UMTS operates at carrier frequency $f_1$ with bandwidth of $B_2$. For example, $B_2$ can be equal to or smaller than $B_1$. The scheduler and resource management will coordinate the radio resources in terms of subcarriers assignment such that overlapped subcarriers from the non-OFDM-based air-interface will not be assigned any data by the other air-interface or assigned with the power level with acceptable interferences to the first air-interface. For example, assuming $B_2$=5 MHz, $B_1$=10 MHz, the subcarriers in $B_1$ that overlaps with $B_2$ will not be assigned any data for LTE air-interface so that 3G UMTS air-interface will assign data to the $B_2$=5 MHz band. Due to the different characteristics of the RF front end of the two air-interfaces, two different RF front end will usually used in this case, even though one unified RF front end is possible in some cases. For example, bandwidth assignment can be static, semi-static, or dynamic with real-time assignment down to smallest resource element. For example, this approach is illustrated in FIG. 5 in accordance with some embodiments.

Figure 5:
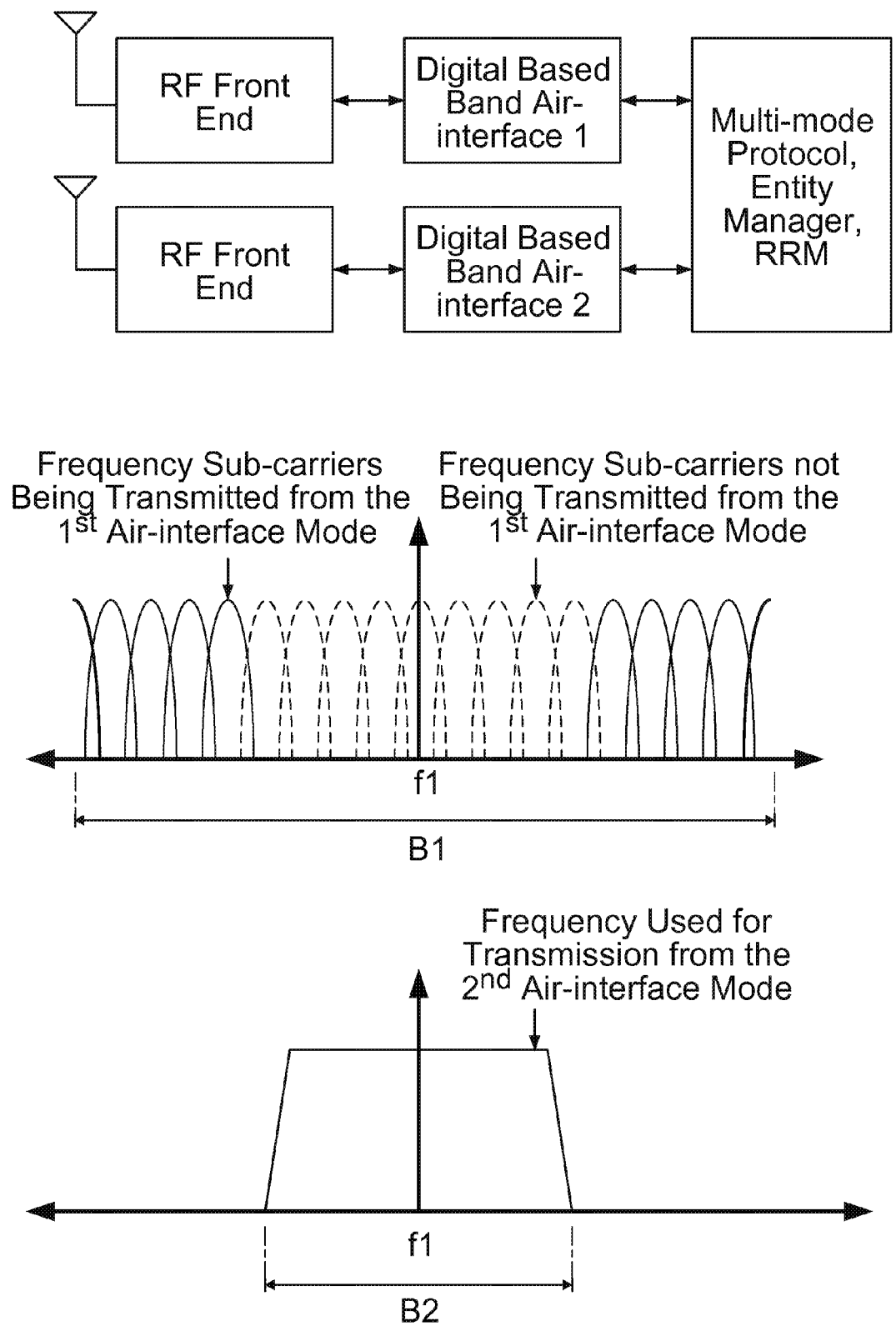
FIG. 5 illustrates an OFDM based air-interface and one non-OFDM based air-interface that operates with frequency band being overlapped in accordance with some embodiments.

FIG. 5 illustrates an OFDM based air-interface and one non-OFDM based air-interface that operates with frequency band being overlapped in accordance with some embodiments.

As will be apparent to one of ordinary skill in the art, even though the example shown LTE and 3G UMTS dual-mode, it can be easily extended to other modes (e.g., WiFi/3G, WiMax/3G, or LTE/GSM, etc.).

In some embodiments, bandwidth usage between the multi-mode air-interfaces can be time-multiplexed, and/or spatial-multiplexed, and/or soft reuse. In some embodiments, soft frequency reuse means that the transmit power level from more than one of the air-interfaces in the overlapped frequency are non-zero.

Figure 6:
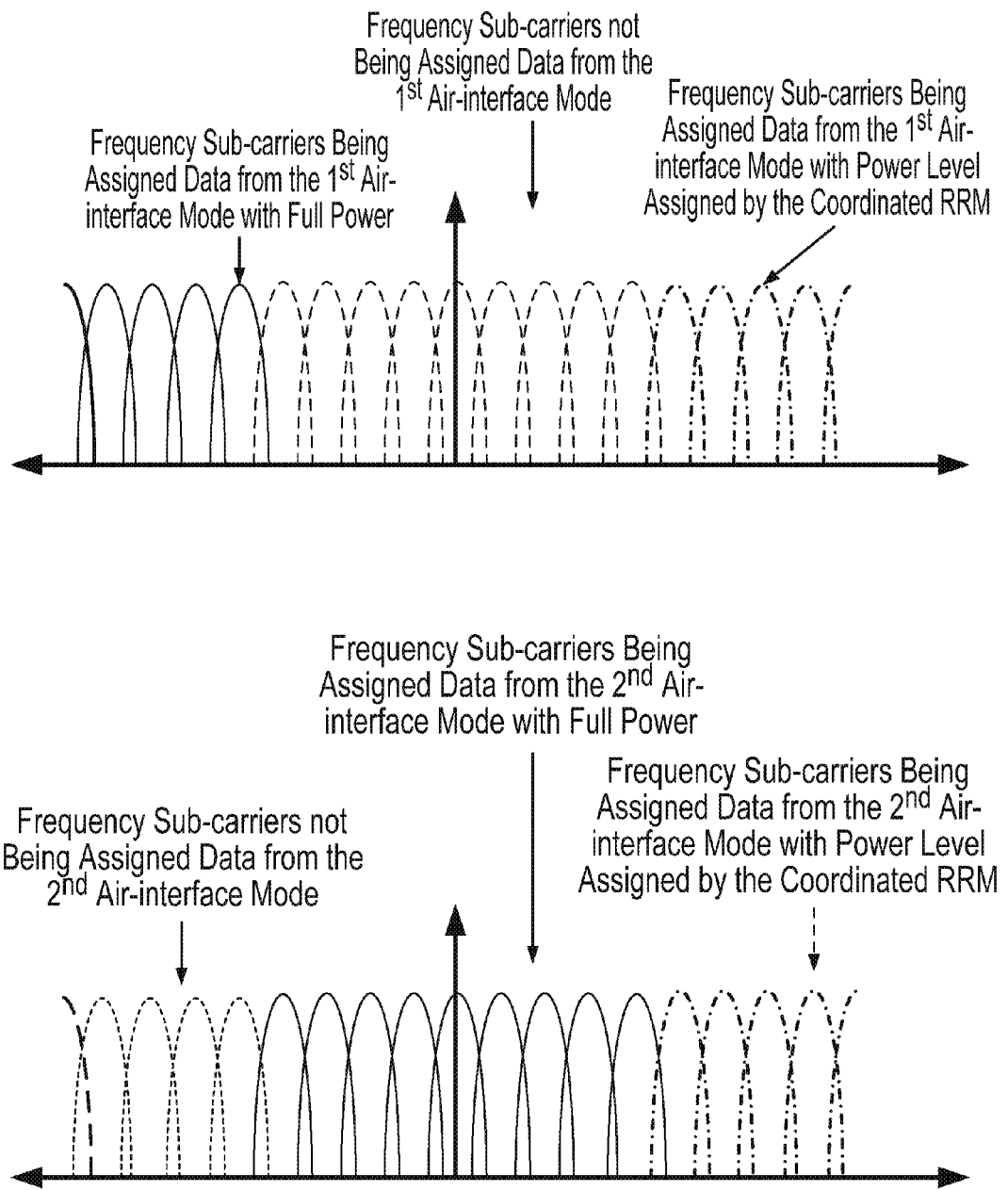
FIG. 6 illustrates soft subcarrier frequency reuse with subcarrier group and lower level being assigned by the coordinated RRM in accordance with some embodiments.

One such example is illustrated in FIG. 6, in which the subcarrier groups and associated power level of the subcarriers are assigned by the coordinated RRM between different modes. In particular, FIG. 6 illustrates soft subcarrier frequency reuse with subcarrier group and power level being assigned by the coordinated RRM in accordance with some embodiments. As would be apparent to one of ordinary skill in the art, it should be noted that this embodiment should apply not only to the case presented in the example, but also apply to the embodiments above and below in which more than one air-interfaces operate in the partially or entire overlapped spectrum frequencies. For example, this approach is illustrated in FIG. 6.

For example, the radio resource management can use similar algorithm(s) as in single air-interface in multiple frequency bands case, described herein. For example, a more efficient RRM algorithm can be derived to take advantage of the multiple air-interface operations and multi-mode UE devices.

In some embodiments, the radio resource management algorithm can be derived by optimizing the sum of the utility functions of each individual UE across all the frequency bands in the following way:

1) The RRM reserves a proper portion of the radio resources in each of the frequency bands, for example, code space in the CDMA case or resource elements on time-frequency plane in the OFDM case, in order to schedule the single mode users. For example, the allocated radio resource for the single mode users can be dynamically adjusted based on the change of requirements such as QoS and number of users and/or other requirements. Depending on the number of users and the bandwidth required in each air-interface mode, the resource management can dynamically increase or decrease the dedicated resources allocated for single mode UEs.

2) The scheduling algorithm schedules the users, which only support single air-interface mode, to the reserved resources in the appropriate frequency band. For example, this can be formulated as an optimization problem to allocation radio resources in each of the frequency bands for all the single-mode users in that band to individually maximize $$\frac{1}{M_j} \sum_{i=1}^{M_j} U_i^1(r_i) \quad j = 1, \ldots, N$$

where $r_i$ is the instantaneous data rate of user i, $U_i^1(\cdot)$ is the corresponding utility function of user i, $M_j$ is number of single-mode users in frequency band j, and N is total number of frequency bands.

3) After the single mode users are scheduled, the scheduling algorithm schedules the users that support multiple air-interfaces to the appropriate frequency band by using the same utility function to all the air-interfaces a UE can support. For example, this can be formulated as an optimization problem as $$\max_x \frac{1}{K} \sum_{j=1}^{K} \left( \frac{1}{M_j} \sum_{i=1}^{M_j} U_i^2(r_{ij} x_{ij}) \right), \text{ subject to } \sum_{j=1}^{K} \left( \sum_{i=1}^{M_j} x_{ij} \right) = 1, x_{ij} \in \{0, 1\}$$

where is the instantaneous data rate of user i with the air-interface supported in frequency band j, $U_i^2(\cdot)$ is the corresponding utility function of user i regardless the air-interface that is being scheduled to use by user i, $M_j$ is number of multi-mode users using the air-interface supported in frequency band j, and K is total number of air-interfaces multi-mode BTS supports. $x_{ij}$ is defined as $$x_{ij} = \begin{cases} 1, & \text{if radio resource in frequency } j \\ & \text{(with associated air-interface) is assigned to user } i \\ 0, & \text{otherwise} \end{cases}$$

The last condition ensures that each multi-mode UE will only be assigned to one air-interface (mode) at any given time. In the case that multi-mode UEs can simultaneously support multiple air-interfaces, $x_{ij}$ can be dropped.

In some embodiments, the radio resource management procedure in step 3) of the above embodiment can be performed in one of the following ways:

a) After the single mode users are scheduled, the scheduling algorithm schedules the users that support multiple air-interfaces to the appropriate air-interface by using different utility functions. For example, the scheduling can be resolved as an optimization problem, and the objective is to allocate radio resources to maximize the sum of the utility functions of all the users across all the appropriate air-interfaces, which can be described as follows:

$$\max_x \frac{1}{K} \sum_{j=1}^{K} \left( \frac{1}{M_j} \sum_{i=1}^{M_j} U_{ij}^2(r_{ij} x_{ij}) \right), \text{ subject to } \sum_{j=1}^{K} \left( \sum_{i=1}^{M_j} x_{ij} \right) = 1, x_{ij} \in \{0, 1\}$$

where $r_{ij}$ is the instantaneous data rate of user i with the air-interface supported in frequency band j, $U_{ij}^2(\cdot)$ is the corresponding utility function of user i with the air-interface supported in frequency band j, $M_j$ is number of multi-mode users using the air-interface supported in frequency band j, and K is total number of air-interfaces multi-mode BTS supports. $x_{ij}$ is defined as in step 3).

b) The RRM reserves a proper portion of the radio resources (e.g., dedicated resources) in each of the air-interface, for example, code space in CDMA case or resource elements on time-frequency plane in OFDM case, in order to schedule the higher priority multi-mode UEs. After the single mode users are scheduled, the scheduling algorithm schedules UEs that support multiple air-interfaces and that have a priority level higher than pre-determined threshold to the dedicated resources. The scheduling is then performed on the remaining UEs. In both dedicated resource scheduling as well as the remaining resource scheduling, For example, the scheduling can be resolved as an optimization problem and it can either based on step a) in this embodiment or step 3) in the previous embodiment, in accordance with some embodiments.

Figure 7:
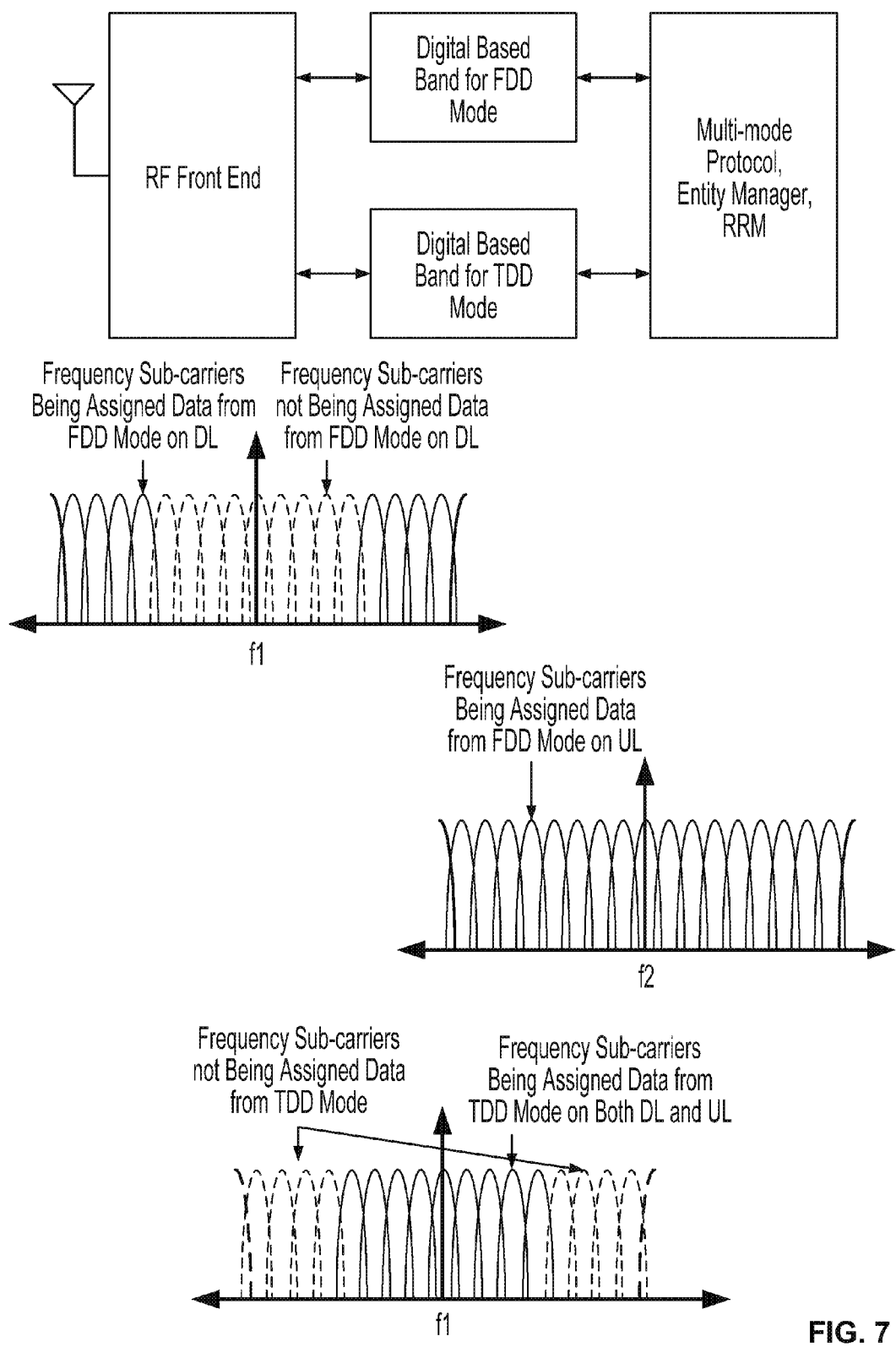
FIG. 7 illustrates an OFDM based TDD air-interface operating within FDD DL frequency in accordance with some embodiments.

In some embodiments, the BTS/AP system supports one air-interface standard in one carrier frequency operating in FDD (Frequency-Division Duplex) mode, and another air-interface standard operating in TDD (Time-Division Duplex), which is in the same carrier frequency as the Downlink (DL) or Uplink (UL) of the FDD mode air-interface standard. TDD operating within FDD DL frequency case is illustrated in FIG. 7 in accordance with some embodiments, and TDD operating within FDD UL frequency is similar in concept. In particular, FIG. 7 illustrates an OFDM based TDD air-interface operating within FDD DL frequency in accordance with some embodiments.

One special case is that two OFDM based air-interface operate in an overlapped bandwidth. For example, a dual-mode LTE FDD and LTE TDD, where LTE FDD operates at carrier frequency $f_1$ with bandwidth of $B_1$ on DL, $f_2$ with bandwidth of $B_1$ on UL, and LTE TDD operates at carrier frequency $f_1$ with bandwidth of $B_2$. $B_2$ can be equal to, or smaller than $B_1$. The scheduler and resource management will coordinate the radio resources in terms of subcarriers assignment such that overlapped subcarriers from one of the air-interface will not be assigned any data by the other air-interface or assigned with the lower level with acceptable interferences to the first air-interface. For example, assuming $B_2$=5 MHz, $B_1$=10 MHz, the subcarriers in $B_1$ at carrier frequency $f_1$ for LTE FDD DL that overlaps with $B_2$ will not be assigned any data for LTE FDD so that LTE TDD will assign data to the $B_2$=5 MHz band at carrier frequency $f_1$. For example, the bandwidth assignment can be static, semi-static, or dynamic with real-time assignment down to smallest resource element. This approach is illustrated FIG. 7 (described above) in accordance with some embodiments.

Figure 8:
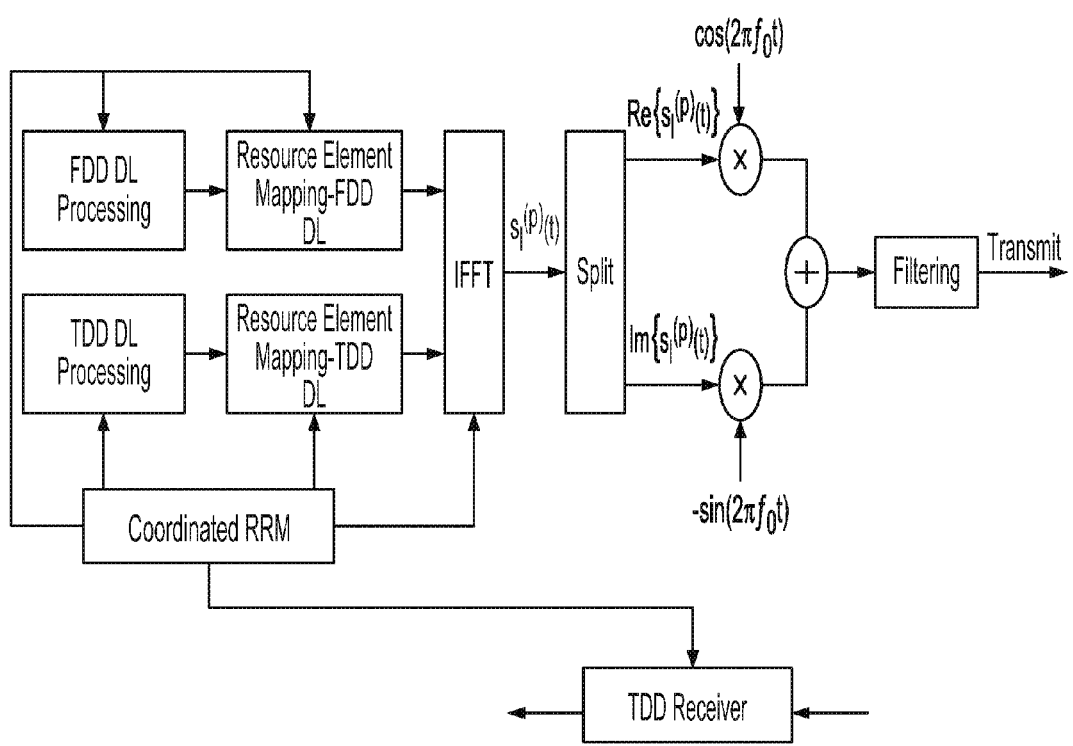
FIG. 8 illustrates a TDD/FDD multi-mode transmitter and receiver in accordance with some embodiments.

An example of one implementation of such dual-mode system is illustrated in FIG. 8 in accordance with some embodiments. In particular, FIG. 8 illustrates a TDD/FDD multi-mode transmitter and receiver in accordance with some embodiments. In this example, it should also be appreciated that other TDD operations can be performed simultaneously at $f_2$ (e.g., UL of the LTE FDD). It should also be appreciated that, even though two air-interfaces are given as example, there could be more than two air-interface supported simultaneously. Those of ordinary skill in the art will further appreciate that even though the described example is LTE FDD and LTE TDD dual-mode, it can be easily extended to other modes (e.g., LTE TDD/WiFi, WiMax TDD/WiFi, WiMax FDD/TDD, UMTS TDD/LTE FDD, LTE, CDMA, OFDM, GSM, WiMax, LTE-A, HDSPA, HSUPA, HSPA, HSPA+, CDMA2000, EDGE, TDMA, 1xEVDO, iDEN, TD-CDMA, and/or other modes or combinations of modes).

In some embodiments, the radio resource management algorithm can be derived by optimizing the sum of the utility functions of each individual UE across all the frequency bands in the following way:

1) The RRM reserves a proper portion of the radio resources in each of the frequency band, for example, resource elements on time-frequency plane in OFDM case, in order to schedule the single mode users. The allocated radio resource for single mode users can be dynamically adjusted based on the change of requirements such as QoS and number of users and/or other requirements. Depending on the number of users and required bandwidth required in each air-interface mode, the resource management can dynamically increase or decrease the actual bandwidth allocated to TDD air-interface by assigning or not assigning the data in some overlapped carriers while assigning or not assigning them in the FDD air-interface.

2) The scheduling algorithm schedules the users, which only support single air-interface mode, to the reserved resources in the appropriate frequency band. For example, this can be formulated as an optimization problem to allocation of radio resources in each of the frequency bands for all the single-mode users in that band to maximize $$\frac{1}{M_j} \sum_{i=1}^{M_j} U_i^1(r_i) \quad j=1, \ldots, N$$

where $r_i$ is the instantaneous data rate of user i, $U_i^1(\cdot)$ is the corresponding utility function of user i, $M_j$ is number of single-mode users in frequency band j, and N is total number of frequency bands.

3) After the single mode users are scheduled, the scheduling algorithm schedules the UEs that support multiple air-interfaces to the appropriate frequency band by using the same utility function to all the air-interfaces a UE can support. For example, this can be formulated as an optimization problem as $$\max_x \frac{1}{K} \sum_{j=1}^{K} \left( \frac{1}{M_j} \sum_{i=1}^{M_j} U_i^2(r_{ij} x_{ij}) \right), \text{ subject to } \sum_{j=1}^{K} \left( \sum_{i=1}^{M_j} x_{ij} \right) = 1, x_{ij} \in \{0, 1\}$$

where $r_{ij}$ is the instantaneous data rate of user i with the air-interface supported in frequency band j, $U_i^2(\cdot)$ is the corresponding utility function of user i with the air-interface that is being scheduled to use by user i, $M_j$ is number of multi-mode users using the air-interface supported in frequency band j, and K is total number of air-interfaces multi-mode BTS supports. $x_{ij}$ is defined as $$x_{ij} = \begin{cases} 1, & \text{if radio resource in frequency } j \\ & \text{(with associated air-interface) is assigned to user } i \\ 0, & \text{otherwise} \end{cases}$$

The last condition ensures that each multi-mode UE will only be assigned to one air-interface (mode) at any given time. In the case that multi-mode UEs can simultaneously support multiple air-interfaces, $x_{ij}$ can be dropped. For example, this approach is illustrated in FIG. 6.

In some embodiments, the radio resource management procedure in step 3) of the above embodiment can be performed in one of the following ways:

a) After the single mode users are scheduled, the scheduling algorithm schedules the users who support multiple air-interfaces to the appropriate air-interface by using different utility functions. For example, the scheduling can be resolved as an optimization problem, and the objective is to allocate radio resources to maximize the sum of the utility functions of all the users across all the appropriate air-interfaces, which can be described as follows:

$$\max_x \frac{1}{K} \sum_{j=1}^{K} \left( \frac{1}{M_j} \sum_{i=1}^{M_j} U_{ij}^2(r_{ij} x_{ij}) \right), \text{ subject to } \sum_{j=1}^{K} \left( \sum_{i=1}^{M_j} x_{ij} \right) = 1, x_{ij} \in \{0, 1\}$$

where $r_{ij}$ is the instantaneous data rate of user i with the air-interface supported in frequency band j, $U_{ij}^2(\cdot)$ is the corresponding utility function of user i with the air-interface supported in frequency band j, $U_{ij}^2(\cdot)$ is number of multi-mode users using the air-interface supported in frequency band j, and K is total number of air-interfaces multi-mode BTS supports. $x_{ij}$ is defined as described above in step 3).

b) The RRM reserves a proper portion of the radio resources (e.g., dedicated resources) in each of the air-interfaces, for example, resource elements on time-frequency plane in the OFDM case, in order to schedule the higher priority multi-mode UEs. After the single mode users are scheduled, the scheduling algorithm schedules UEs that support multiple air-interfaces and that have a priority level higher than pre-determined threshold to the dedicated resources. The scheduling is then done to the remaining UEs. In both dedicated resource scheduling as well as the remaining resource scheduling, For example, the scheduling can be resolved as an optimization problem, and, for example, it can either be based on step a) in this embodiment or step 3) in the previously described embodiment.

Figure 9:
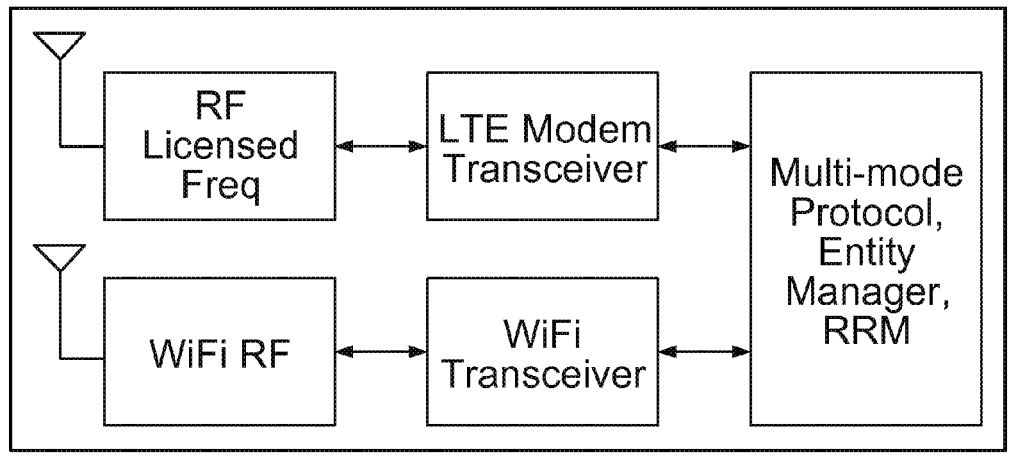
FIG. 9 illustrates a dual-mode base station that supports cellular and WiFi air-interfaces in accordance with some embodiments.

In some embodiments, the BTS/AP system supports a cellular air-interface in a licensed band and Wi-Fi (IEEE802.1x) or other non-cellular standard on unlicensed bands in a coordinated manner to be described below, in order to improve the overall system performance, such as shown in FIG. 9 in accordance with some embodiments. In particular, FIG. 9 illustrates a dual-mode base station that supports cellular and WiFi air-interfaces in accordance with some embodiments.

In some embodiments, the radio resource management algorithm can be derived by optimizing the sum of the utility functions of each individual UE across all the frequency bands in following way:

1) The RRM reserves a proper portion of the radio resources in each of the frequency band, for example, resource elements on time-frequency plane in OFDM case in order to schedule the single mode users. For example, the allocated radio resource for the single mode users can be dynamically adjusted based on the change of requirements, such as QoS and number of users and/or other requirements.

2) The scheduling algorithm schedules the users that only support single air-interface mode to the reserved resources in the appropriate frequency band, that is, assign Wi-Fi single mode user to the frequency associated with the Wi-Fi air-interface and cellular single mode to the frequency associated with the cellular air-interface. For example, this can be formulated as an optimization problem to allocation of radio resources in each of the frequency bands for all the single-mode users in that band to maximize $$\frac{1}{M_j} \sum_{i=1}^{M_j} U_i^1(r_i) \quad j=1, \ldots, N$$

where $r_i$ is the instantaneous data rate of user i, $U_i^1(\cdot)$ is the corresponding utility function of user i, $M_j$ is number of single-mode users in frequency band j, and N is total number of frequency bands.

3) After the single mode users are scheduled, the scheduling algorithm schedules the UEs that support multiple air-interfaces to the appropriate frequency band by using the same utility function to all the air-interfaces a UE can support. For example, this can be formulated as an optimization problem as $$\max_x \frac{1}{K}\sum_{j=1}^{K}\left(\frac{1}{M_j}\sum_{i=1}^{M_j}U_i^2(r_{ij}x_{ij})\right), \text{ subject to } \sum_{j=1}^{K}\left(\sum_{i=1}^{M_j}x_{ij}\right)=1, x_{ij}\in\{0,1\}$$

where is the instantaneous data rate of user i with the air-interface supported in frequency band j, $U_i^2(\cdot)$ is the corresponding utility function of user i regardless the air-interface that is being scheduled to use by user i, $M_j$ is number of multi-mode users using the air-interface supported in frequency band j, and K is total number of air-interfaces multi-mode BTS supports. $x_{ij}$ is defined as $$x_{ij}=\begin{cases}1, & \text{if radio resource in frequency } j \\ & \text{(with associated air-interface) is assigned to user } i \\ 0, & \text{otherwise}\end{cases}$$

The last condition ensures that each multi-mode UE will only be assigned to one air-interface (mode) at any given time. In the case that multi-mode UEs can simultaneously support multiple air-interfaces, $x_{ij}$ can be dropped.

In some embodiments, the radio resource management procedure in step 3) of the above described embodiment can be performed in one of the following ways:

a) After the single mode users are scheduled, the scheduling algorithm schedules the users who support multiple air-interfaces to the appropriate air-interface by using different utility functions. For example, the scheduling can be resolved as an optimization problem, and the objective is to allocate radio resources to maximize the sum of the utility functions of all the users across all the appropriate air-interfaces, which can be described as follows:

$$\max_x \frac{1}{K}\sum_{j=1}^{K}\left(\frac{1}{M_j}\sum_{i=1}^{M_j}U_{ij}^2(r_{ij}x_{ij})\right), \text{ subject to } \sum_{j=1}^{K}\left(\sum_{i=1}^{M_j}x_{ij}\right)=1, x_{ij}\in\{0,1\}$$

where $r_{ij}$ is the instantaneous data rate of user i with the air-interface supported in frequency band j, $U_{ij}^2(\cdot)$ is the corresponding utility function of user i with the air-interface supported in frequency band j, $M_j$ is number of multi-mode users using the air-interface supported in frequency band j, and K is total number of air-interfaces multi-mode BTS supports. $x_{ij}$ is defined as described above in step 3).

b) The RRM reserves a proper portion of the radio resources (e.g., dedicated resources) in each of the frequency bands, for example, resource elements on time-frequency plane in the OFDM case in order to schedule the higher priority multi-mode UEs. After the single mode users are scheduled, the scheduling algorithm schedules UEs that support multiple frequency band modes and that have a priority level higher than a pre-determined threshold to the dedicated resources. The scheduling is then performed on the remaining UEs. In both dedicated resource scheduling as well as the remaining resource scheduling, for example, the scheduling can be resolved as an optimization problem, and it can either based on step a) as described in this embodiment or step 3) as described above in the previous embodiment.

Figure 10:
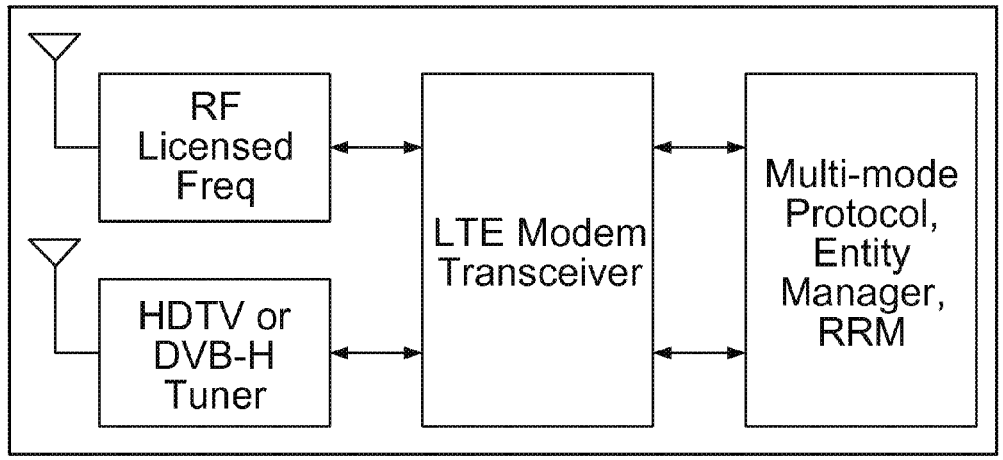
FIG. 10 illustrates a dual-mode base station that supports cellular and DTV related air-interfaces in accordance with some embodiments.

In some embodiments, the BTS/AP system supports cellular or wireless air-interfaces in cellular a licensed band or unlicensed band, and HDTV or mobile TV, such as DVB-T, DVB-H and so on, on unlicensed, licensed or broadcast band, in a coordinated manner as described below, in order to improve the overall system performance, as shown in FIG. 10 in accordance with some embodiments. In particular, FIG. 10 illustrates a dual-mode base station that supports cellular and DTV related air-interfaces in accordance with some embodiments.

Figure 11:
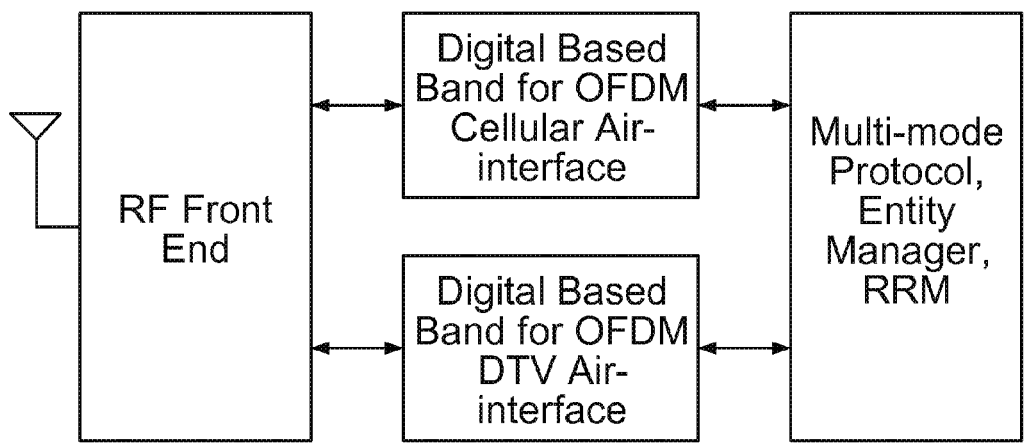
FIG. 11 illustrates a dual-mode base station that supports cellular and DTV related air-interfaces within the same frequency band in accordance with some embodiments.

In some embodiments, the BTS/AP system supports cellular or wireless air-interface in cellular a licensed frequency band or unlicensed band, and HDTV or mobile TV, such as DVB-T or DVB-H in the same frequency band, in a coordinated manner as described below. One such example is to use two air-interfaces in white space to deliver both cellular and digital TV services, as shown in FIG. 11 in accordance with some embodiments. In particular, FIG. 11 illustrates a dual-mode base station that supports cellular and DTV related air-interfaces within the same frequency band in accordance with some embodiments.

Figure 12:
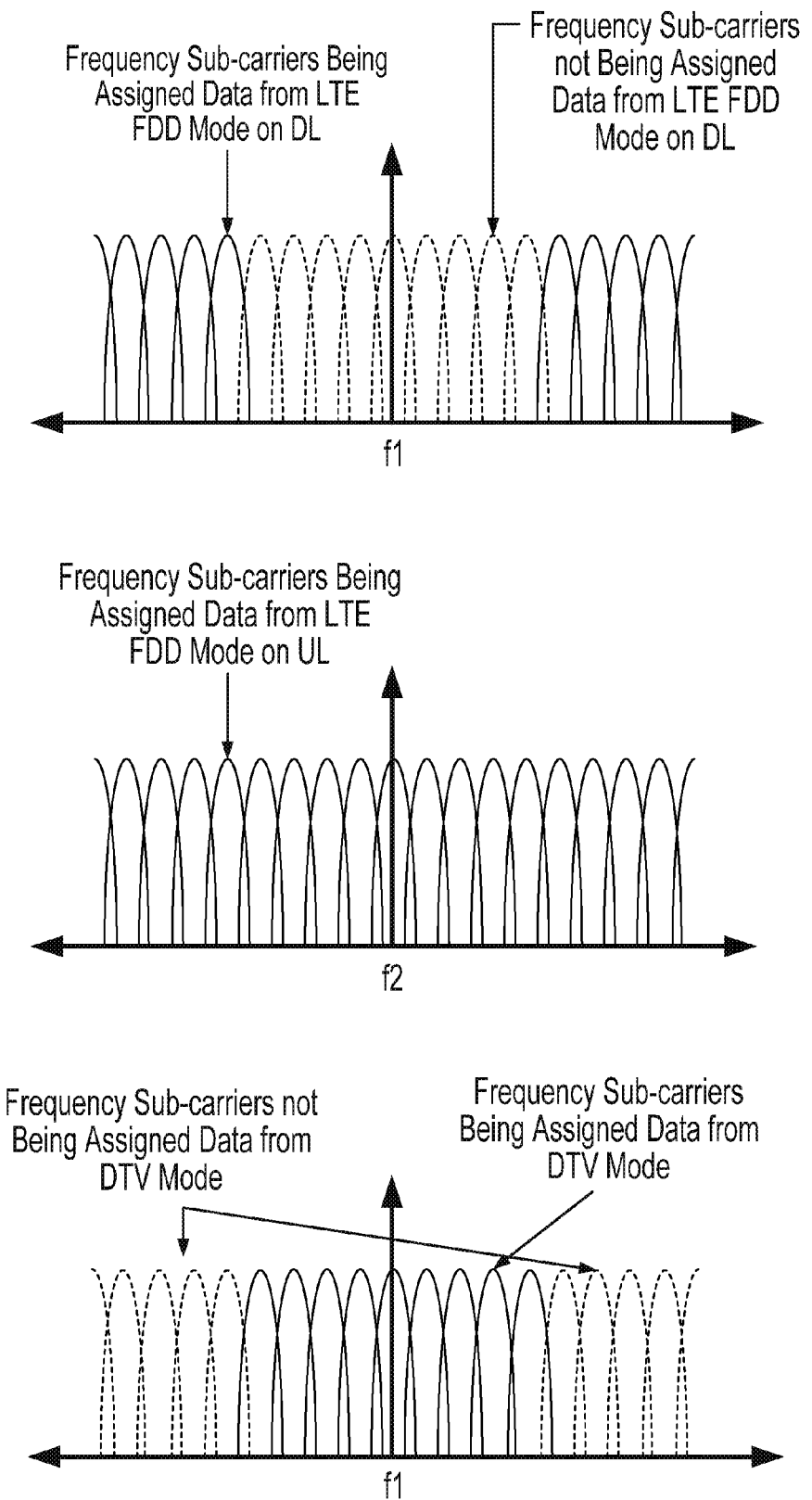
FIG. 12 illustrates an OFDM based DTV air-interface operating within OFDM based FDD air-interface's DL frequency in accordance with some embodiments.

For example, one special case is the cellular or wireless air-interface and digital TV standard are both OFDM based, and they are using overlapped frequency band. For example, an LTE operates at carrier frequency $f_1$ with bandwidth of $B_1$ and DVB-T operates at carrier frequency $f_1$ with bandwidth of $B_2$. $B_2$ can be equal to, smaller than $B_1$. The scheduler and resource management will coordinate the radio resources in terms of subcarriers assignment such that overlapped subcarriers from one of the air-interface will not be assigned any data by the other air-interface or assigned with the power level acceptable to the first air-interface. For example, assuming $B_2=5$ MHz, $B_1=10$ MHz, the subcarriers in $B_1$ that overlaps with $B_2$ will not be assigned any data for LTE air-interface so that DVB-T air-interface will assign data to the $B_2=5$ MHz band. For example, the bandwidth assignment can be static, semi-static, or dynamic with real-time assignment down to smallest resource element. This approach is illustrated in FIG. 12 in accordance with some embodiments. In particular, FIG. 12 illustrates an OFDM based DTV air-interface operating within OFDM based FDD air-interface's DL frequency in accordance with some embodiments. Those of ordinary skill in the art will appreciate that even though the example is described as an LTE and DVB-T dual-mode, it can be easily extended to other modes (e.g., LTE/DVB-H, WiMax/DVB-T, WiMax/DVB-H, WiFi/DVB-T/H and/or other modes/combinations of modes).

In some embodiments, the various multi-mode BTS systems described herein do not have to be in one single BTS device or location, that is, the two or more modes can be deployed in more than one devices or locations to form a multi-tier base station system. In some embodiments, a multi-mode BTS system includes the above described components even though such components may or may not be co-located. One such example is a 2-tier cellular system with Macrocell BTS employs one air-interface and one or more Picocell or Femtocell BTSs employ different air-interfaces.

Figure 13:
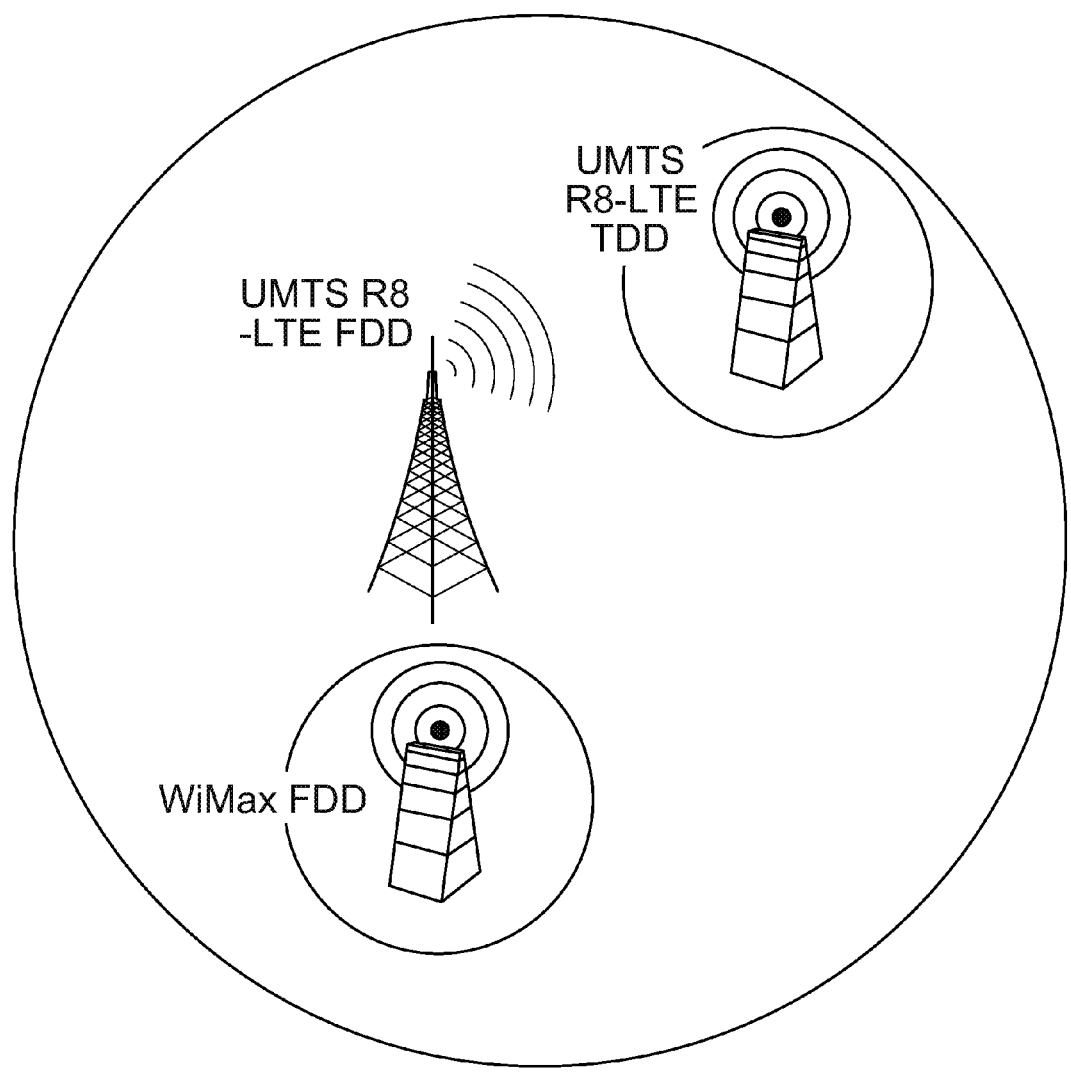
FIG. 13 illustrates a 2-tier multi-mode BTS system in accordance with some embodiments.

FIG. 13 illustrates a 2-tier multi-mode BTS system in accordance with some embodiments. In particular, FIG. 13 illustrates the cell system level view of the case in which the Macrocell operates with LTE FDD air-interface standard, one of the Femtocell BTSs uses LTE TDD, and the other uses WiMax FDD air-interface standard.

Figure 14:
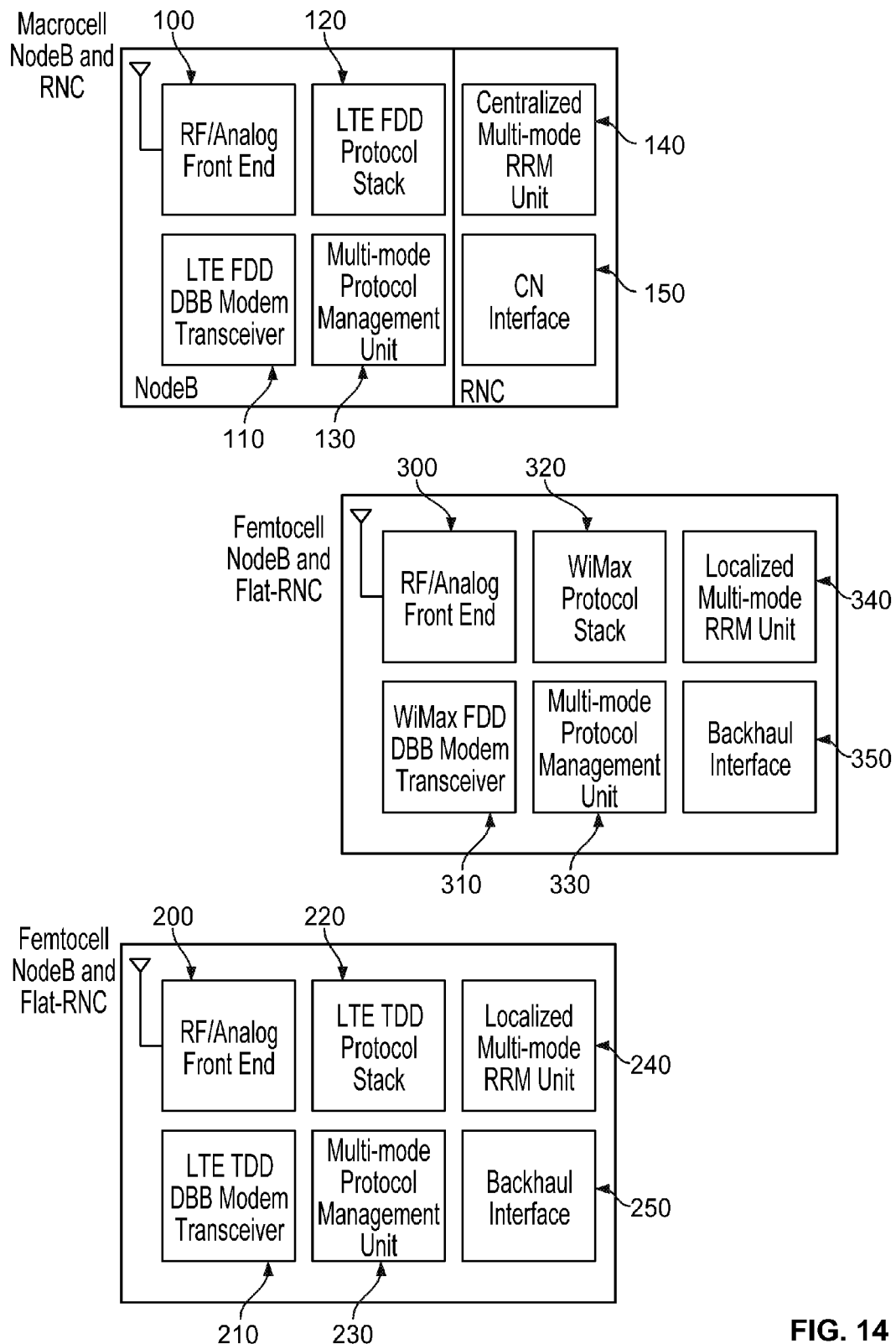
FIG. 14 illustrates a 2-tier multi-mode BTS system from the RRM point of view in accordance with some embodiments.

FIG. 14 illustrates a 2-tier multi-mode BTS system from the RRM point of view in accordance with some embodiments. As can be seen from FIG. 14, the radio resource management and scheduling now needs to be done through coordination of the centralized RRM and localized RRM. In some embodiments, the protocol management that is used for coordinating the protocols of multiple air-interfaces may also need to be distributed in different BTSs (NodeBs).

For example, one special case is that the two BTSs operating with two different OFDM based air-interfaces use the same bandwidth. For example, an LTE Macrocell and WiMax AP, in which LTE operates at carrier frequency $f_1$ with bandwidth of $B_1$ and WiMax operates at carrier frequency $f_2$ with bandwidth of $B_2$. $B_2$ can be equal to, smaller or larger than $B_1$. The resource management from the two BTSs will coordinate the radio resources in terms of subcarriers assignment such that overlapped subcarriers from one of the air-interface will not be assigned any data by the other air-interface. For example, assuming $B_2=5$ MHz, $B_1=10$ MHz, the Macrocell BTS can use an RF front end with bandwidth of 10 MHz for transmitting. In digital baseband, the subcarriers in frequency domain belongs to $B_1$ that overlaps with $B_2$ will not be assigned any data for LTE air-interface so that WiMax air-interface of AP that has an RF front end of $B_2=5$ MHz band will assign data to these subcarriers. For example, the bandwidth assignment can be static, semi-static, or dynamic with real-time assignment down to smallest resource element. Those of ordinary skill in the art will appreciate that even though the example is described as LTE and WiMax, it can be easily extended to other modes (e.g., LTE/WiFi, WiMax/WiFi, and/or other modes/combinations of modes).

For example, another special case is an OFDM based air-interface that operates with another non-OFDM based air-interface using the overlapped frequency. For example, a Femtocell LTE BTS and a 3G UMTS Macrocell BTS, in which LTE operates at carrier frequency $f_1$ with bandwidth of $B_1$ and 3G UMTS operates at carrier frequency $f_1$ with bandwidth of $B_2$. $B_2$ can be equal to or smaller than $B_1$. The resource management from the two BTSs will coordinate the radio resources in terms of subcarriers assignment such that overlapped subcarriers from the non-OFDM-based air-interface will not be assigned any data by the OFDM-based air-interface or assigned with a power level acceptable by the non-OFDM-based air-interface. For example, assuming $B_2=5$ MHz, $B_1=10$ MHz, the subcarriers in $B_1$ that overlaps with $B_2$ will not be assigned any data for LTE air-interface so that 3G UMTS air-interface will assign data to the $B_2=5$ MHz band. For example, the bandwidth assignment can be static, semi-static, or dynamic with real-time assignment down to smallest resource element. Those of ordinary skill in the art will appreciate that even though the example is described as LTE and 3G UMTS, it can be easily extended to other modes (e.g., WiFi/3G, WiMax/3G, or LTE/GSM, and/or other modes/combinations of modes).

In some embodiments, the scheduler in the radio resource management unit can still be derived by optimizing the sum of the utility functions of each individual user for the above described embodiment in the one of the following ways:
1) The scheduling algorithm schedules the users in each of the BTSs independently.
2) The scheduling algorithm schedules the users in both BTSs coordinately based on well known techniques that have mathematically formulated the problem on the assumptions that a system is one BTS and all the user terminals (UEs) being considered are associated with the BTS under study. As a result, the cost function as well as its optimization targets how to maximize a cost function with respect to some or all users in one BTS subject to the capacity limit and other constraints such that certain performance measures are achieved. Hence, the scheduler and resource management algorithms derived from above assumption and theory are for scheduling UEs in individual BTS without considering other BTSs, their corresponding schedulers, and their UEs. Mathematically, the above optimization problem is to assign radio resources in order to maximize the following cost function:

$$\frac{1}{M} \sum_{i=1}^{M} U_i(r_i[n])$$

where $r_i$ [n] is the instantaneous dates of user i at time n, $U_1(\cdot)$ is the corresponding utility function of user i.

Again, all the users are in the same cell or being served by one BTS, and the optimization is done with respect to one cell or BTS. For example, on the implementation side, the scheduler can reside in the BTS, or NodeB in 3GPP terminal. The scheduler is responsible for assigning radio resources to the UEs in the cell based on the available radio resources, user channel quality, user request, and QoS requirements.

In some embodiments, a Macrocell BTS supports one air-interface standard in one carrier frequency in the FDD mode and a BTS with smaller footprint (e.g., Picocell BTS or Femtocell BTS) supports another air-interface standard operates in the TDD in the same carrier frequency as DL or UL of the FDD mode air-interface standard.

For example, one special case is that two OFDM based air-interfaces are using the same or different bandwidth, for example, LTE FDD and LTE TDD, in which Macrocell BTS using LTE FDD operates at carrier frequency $f_1$ with bandwidth of $B_1$ on DL, at $f_2$ with bandwidth of $B_1$ on UL, and Picocell or Femtocell BTS using LTE TDD operates at carrier frequency $f_1$ with bandwidth of $B_2$. $B_2$ can be equal to, or smaller than $B_1$. The scheduler and resource management will coordinate the radio resources in terms of subcarriers assignment such that overlapped subcarriers from one of the air-interface will not be assigned any data by the other air-interface or assigned with a power level acceptable to the air-interface operates in these subcarriers. For example, assuming $B_2=5$ MHz, $B_1=10$ MHz, the subcarriers in $B_1$ at $f_1$ for LTE FDD DL that overlaps with $B_2$ will not be assigned any data for LTE FDD so that LTE TDD will assign data to the $B_2=5$ MHz band at $f_1$. For example, the bandwidth assignment can be static, semi-static, or dynamic with real-time assignment down to smallest resource element. Those of ordinary skill in the art will also appreciate that other TDD operations can be performed simultaneously at $f_2$, e.g. UL of the LTE FDD. Those of ordinary skill in the art will also appreciate that even though two air-interfaces are described in this example, there could be more than two air-interface supported simultaneously.

In some embodiments, a BTS with smaller footprint (e.g., a Picocell BTS or Femtocell) BTS supports one air-interface standard in one carrier frequency in the mode and a Macrocell BTS supports another air-interface standard operates in the TDD mode in the same carrier frequency as the DL or UL of the FDD mode air-interface standard. Those of ordinary skill in the art will also appreciate that while the example is described as LTE FDD and LTE TDD dual-mode, it can be easily extended to other modes (e.g., LTE TDD/WiFi, WiMax TDD/WiFi, WiMax FDD/TDD, UMTS TDD/LTE FDD, and/or other modes/combinations of modes).

In some embodiments, the scheduler in the radio resource management unit can still be derived by optimizing the sum of the utility functions of each individual user for the above described embodiment in the one of the following ways:
1) The scheduling algorithm schedules the users in each of the BTSs independently.
2) The scheduling algorithm schedules the users in both BTSs coordinately based on well known techniques that have mathematically formulated the problem on the assumptions that a system is one BTS and all the user terminals (UEs) being considered are associated with the BTS under study. As a result, the cost function as well as its optimization targets how to maximize a cost function with respect to some or all users in one BTS subject to the capacity limit and other constraints such that certain performance measures are achieved. Hence, the scheduler and resource management algorithms derived from above assumption and theory are for scheduling UEs in individual BTS without considering other BTSs, their corresponding schedulers, and their UEs. Mathematically, the above optimization problem is to assign radio resources in order to maximize the following cost function:

$$\frac{1}{M}\sum_{i=1}^{M} U_i(r_i[n])$$

where $r_i[n]$ is the instantaneous dates of user i at time n, $U_i(\cdot)$ is the corresponding utility function of user i. Again, all the users are in the same cell or being served by one BTS, and the optimization is done with respect to one cell or BTS. For example, on the implementation side, the scheduler can reside in the BTS, or NodeB in 3GPP terminal. The scheduler is responsible for assigning radio resources to the UEs in the cell based on the available radio resources, user channel quality, user request, and QoS requirements.

Figure 15:
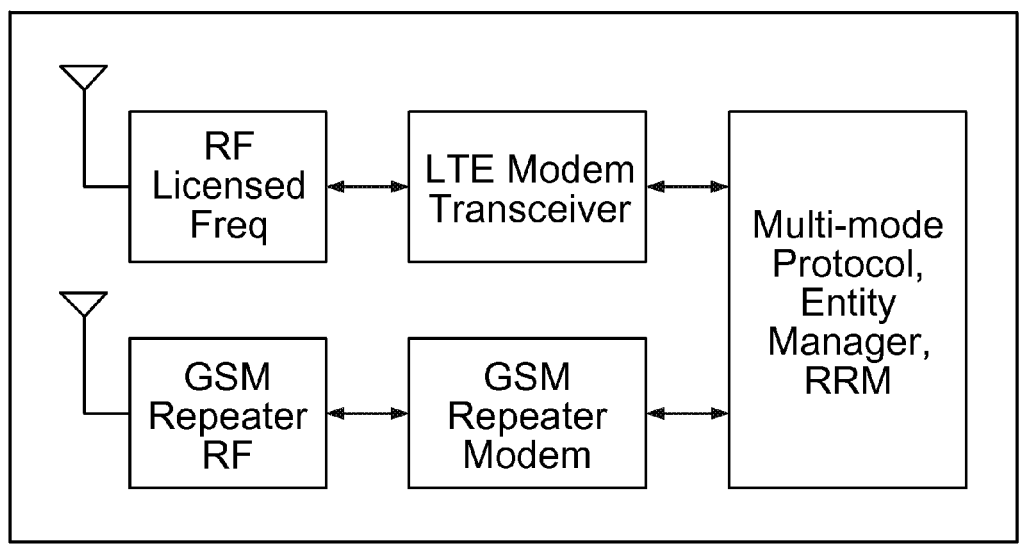
FIG. 15 illustrates a dual-mode device that supports cellular station and a repeater in accordance with some embodiments.

In some embodiments, the Femtocell/AP system supports a cellular or wireless air-interface in a cellular licensed frequency band or unlicensed band, and a cellular repeater for a Macrocell BTS with the same or different air-interface as the Femtocell/AP in the licensed frequency band, in a coordinated manner as described below and as illustrated in FIG. 15 in accordance with some embodiments. In particular, FIG. 15 illustrates a dual-mode device that supports cellular station and a repeater in accordance with some embodiments.

Figure 16:
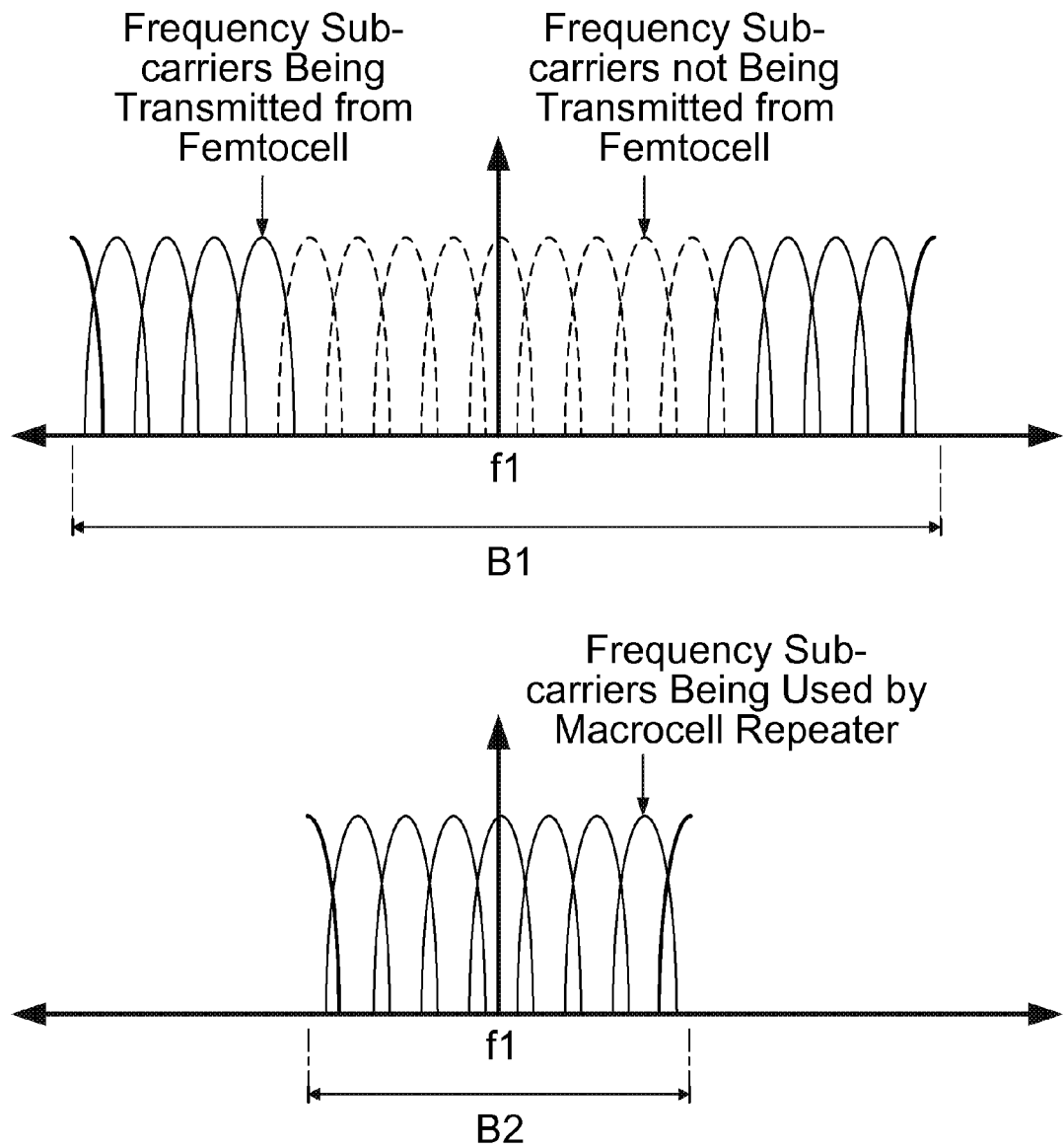
FIG. 16 illustrates a Femtocell with OFDM based air-interface and Macrocell repeater with OFDM based air-interface operate with frequency band being overlapped in accordance with some embodiments.

One example is that the cellular or wireless air-interface and repeater standard are both OFDM based, and they are using overlapped bandwidth. For example, a LTE Femtocell operates at carrier frequency $f_1$ with bandwidth of $B_1$ and the macro repeater using LTE air-interface operates at carrier frequency $f_1$ with bandwidth of $B_2$. $B_2$ can be equal to, smaller or larger than $B_1$. The scheduler and resource management will coordinate the radio resources in terms of subcarriers assignment such that overlapped subcarriers from one of the air-interface will not be assigned any data. For example, assuming $B_2$=5 MHz, $B_1$=10 MHz, the subcarriers in $B_1$ that overlaps with $B_2$ will not be assigned any data by LTE Femtocell so that LTE Macrocell will assign data to the $B_2$=5 MHz band. When there are no users using Macrocell repeater, the LTE Femtocell can choose to use the entire $B_1$=10 MHz bandwidth. For example, the bandwidth assignment can be static, semi-static, or dynamic with real-time assignment down to smallest resource element. This approach is illustrated in FIG. 16 in accordance with some embodiments. In particular, FIG. 16 illustrates a Femtocell with OFDM based air-interface and Macrocell repeater with OFDM based air-interface operate with frequency band being overlapped in accordance with some embodiments. Those of ordinary skill in the art will also appreciate that while the example is described as LTE Femtocell/LTE repeater, it can be easily extended to other modes (e.g., LTE/WiMax, WiMax/LTE, WiFi/LTE, WiFi/WiMax, LTE FDD/LTE TDD, LTE TDD/LTE FDD, etc., and/or other modes/combinations of modes).

Figure 17:
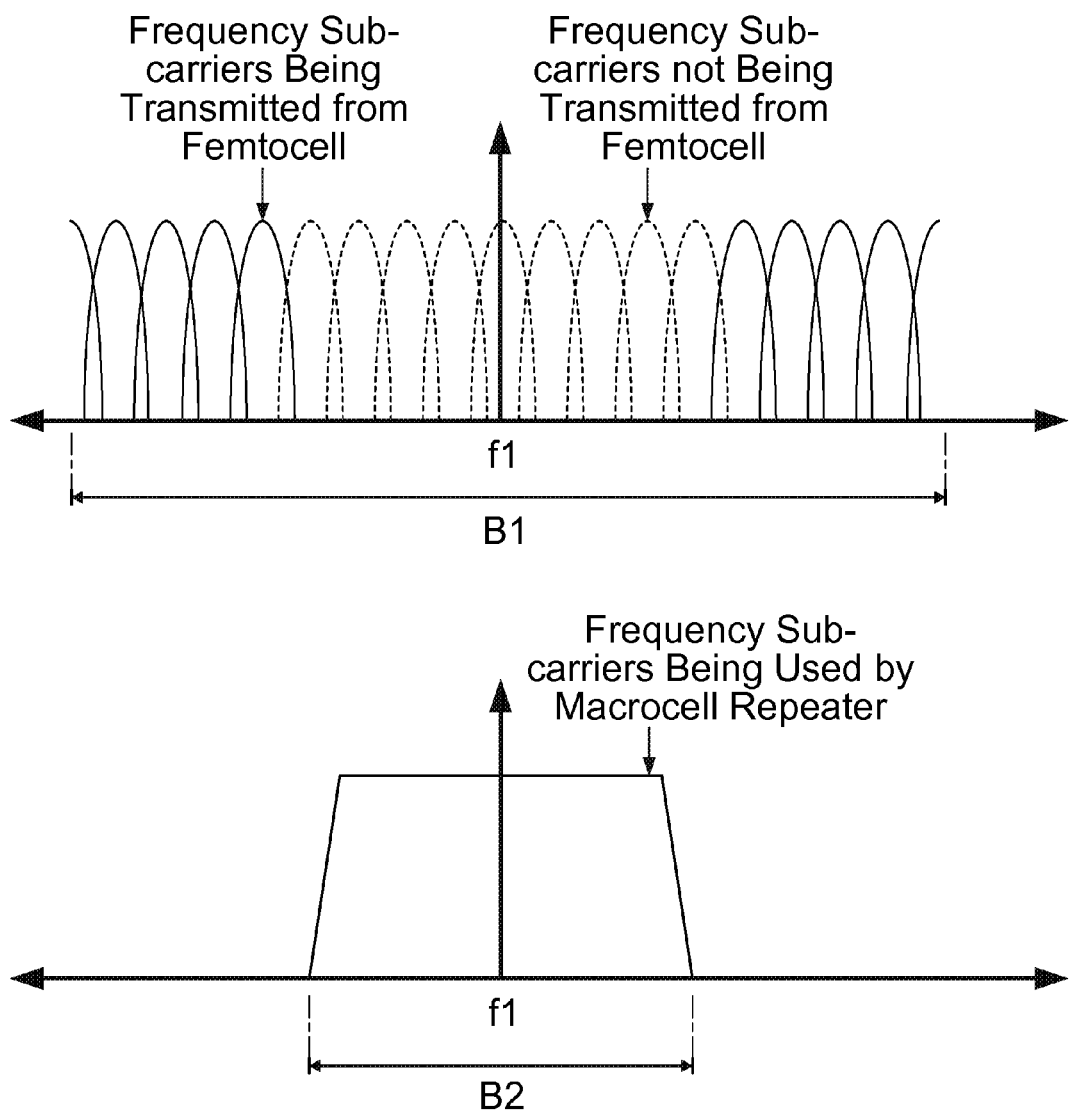
FIG. 17 illustrates a Femtocell with OFDM based air-interface and Macrocell repeater with non-OFDM based air-interface operate with frequency band being overlapped in accordance with some embodiments.

Another example is a Femtocell with an OFDM based air-interface that operates with a Macrocell repeater with non-OFDM based air-interface using the overlapped bandwidth. For example, an LTE Femtocell and 3G UMTS repeater, in which LTE operates at carrier frequency $f_1$ with bandwidth of $B_1$ and 3G UMTS operates at carrier frequency $f_1$ with bandwidth of $B_2$. $B_2$ can be equal to or smaller than $B_1$. The scheduler and resource management will coordinate the radio resources in terms of subcarriers assignment such that overlapped subcarriers from the non-OFDM-based air-interface will not be assigned any data by the other air-interface. For example, assuming $B_2$=5 MHz, $B_1$=10 MHz, the subcarriers in $B_1$ that overlaps with $B_2$ will not be assigned any data for LTE air-interface so that 3G UMTS air-interface will assign data to the $B_2$=5 MHz band. When there are no users using the Macrocell repeater, the LTE Femtocell can choose to use the entire $B_1$=10 MHz bandwidth. For example, the bandwidth assignment can be static, semi-static, or dynamic with real-time assignment down to smallest resource element. This example is illustrated in FIG. 17 in accordance with some embodiments. In particular, FIG. 17 illustrates a Femtocell with OFDM based air-interface and Macrocell repeater with non-OFDM based air-interface operate with frequency band being overlapped in accordance with some embodiments. Those of ordinary skill in the art will also appreciate that while the example is described as an LTE Femtocell/3G UMTS repeater, it can be easily extended to other modes (e.g., WiFi/3G, WiMax/3G, LTE/GSM, and/or other modes/combinations of modes).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
    a multi-mode communication unit, wherein the multi-mode communication unit allocates access for wireless communication using at least two modes based on a scheduling function to coordinate transmissions using a multi-mode modem, wherein allocates access for wireless communication using the at least two modes comprises coordinating a radio resources assignment by assigning subcarriers such that overlapped subcarriers of a first overlapping mode will not be assigned data by a second overlapping mode; and wherein the access is dynamically allocated between at least two multi-mode air interfaces of the multi-mode communication unit based on one or more of the following functions: a spatial multiplex function, a soft reuse function, and a frequency reuse function, wherein the at least two modes use at least two frequency bands, and wherein the at least two frequency bands are overlapping; and
    a processor configured to implement at least in part the multi-mode communications unit.
2. The system recited in claim 1, wherein the multi-mode communication unit allocates access for wireless communication using the at least two modes comprises coordinating a radio resources assignment.

3. The system recited in claim 1, wherein the multi-mode communication unit allocates access for wireless communication using the at least two modes comprises coordinating a radio resources assignment based on the scheduling function, and wherein the scheduling function allocates the radio resources.

4. The system recited in claim 1, wherein the multi-mode communication unit allocates access for wireless communication using the at least two modes comprises coordinating a radio resources assignment based on the scheduling function, and wherein the scheduling function determines scheduling between the at least two multi-mode air interfaces of the multi-mode communication unit based on one or more of the following: frequency, bandwidth, interference, quality of service, service type, application type, device type, service provider, number of users, and spectrum availability.

5. The system recited in claim 1, wherein the multi-mode communication unit allocates access for wireless communication using the at least two modes based on a first scheduling function for a first frequency band mode and based on a second scheduling function for a second frequency band mode.

6. The system recited in claim 1, wherein the multi-mode communication unit allocates access for wireless communication using the at least two modes based on a first scheduling function for a first frequency band mode and based on a second scheduling function for a second frequency band mode, and wherein a first overlapping band mode and a second overlapping band mode are assigned power levels that are non-zero.

7. The system recited in claim 1, wherein the multi-mode communication unit allocates access for wireless communication using at least two frequency bands that are overlapping, and wherein the at least two frequency bands that are overlapping comprise a first frequency band that is a subset and/or a superset of a second frequency band.

8. The system recited in claim 1, wherein the at least two modes include one or more of the following: frequency band, protocol standard, duplexing format, and one-way communication mode.

9. The system recited in claim 1, wherein the at least two modes include at least one broadcast mode.

10. The system recited in claim 1, wherein the at least two modes include at least one broadcast mode, and wherein the at least one broadcast mode includes a television broadcast mode or a radio broadcast mode.

11. The system recited in claim 1, wherein the system is a multi-mode device, and wherein the multi-mode device is a terminal.

12. The system recited in claim 1, wherein the system is a multi-mode device, wherein the multi-mode device is a terminal, and wherein the terminal is selected from one or more of the following: a mobile phone, UE, Datacard, broadcast receiver, and broadcast transmitter.

13. The system recited in claim 1, wherein the system is a multi-mode device, and wherein the multi-mode device is a base station.

14. The system recited in claim 1, wherein the system is a multi-mode device, and wherein the multi-mode device is a repeater.

15. The system recited in claim 1, wherein the system is a multi-mode device, and wherein the multi-mode device communicates with other multi-mode devices in a peer-to-peer wireless communication network.

16. The system recited in claim 1, wherein the system is a multi-mode device, wherein the multi-mode device is a base station, and wherein the base station is selected from one or more of the following: a cellular base station, a microcell base station, a Macrocell base station, a Picocell base station, a Femtocell base station, an Access Point (AP), a Set Top Box (STB), a Home Gateway, a Hot Spot Device, a User Terminal, a repeater, nodeB, and WiFi.

17. The system recited in claim 1, wherein the multi-mode communication unit includes a radio resource manager.

18. The system recited in claim 1, wherein the multi-mode communication unit includes a multi-mode radio resource manager.

19. The system recited in claim 1, wherein the multi-mode communication unit includes a radio resource manager, and wherein the radio resource manager performs at least in part the allocation of access for wireless communication using at least two modes.

20. The system recited in claim 1, wherein the multi-mode communication unit includes a radio resource manager and a protocol management unit, and wherein the radio resource manager and the protocol management unit perform at least in part the allocation of access for wireless communication using at least two modes.

21. The system recited in claim 1, wherein the multi-mode communication unit includes a radio resource manager, a protocol management unit, and a plurality of multi-mode protocol stacks, and wherein the radio resource manager, the protocol management unit, and the plurality of multi-mode protocol stacks perform at least in part the allocation of access for wireless communication using at least two modes.

22. The system recited in claim 1, further comprising:
an RF/analog front end, wherein the multi-mode communication is provided at least in part using the RF/analog front end.

23. The system recited in claim 1, further comprising:
an antenna, wherein the multi-mode communication is provided at least in part using the antenna.

24. The system recited in claim 1, wherein the system is a 2-tier multi-mode base station system, and wherein the multi-mode communication unit operates using a first air-interface standard and a second air-interface standard.

25. The system recited in claim 1, wherein the system includes a repeater, and wherein the repeater operates as a terminal and as a base station.

26. A method, comprising:
executing a multi-mode communication unit using a processor, wherein the multi-mode communication unit allocates access for wireless communication using at least two modes, wherein the multi-mode communication unit allocates access for wireless communication using the at least two modes comprises coordinating a radio resources assignment by assigning subcarriers such that overlapped subcarriers of a first overlapping mode will not be assigned data by a second overlapping mode; and wherein the multi-mode communication unit allocates access for communication using the at least two modes based on a scheduling function to coordinate transmissions using a multi-mode modem, wherein the access is dynamically allocated between at least two multi-mode air interfaces of the multi-mode communication unit based on one or more of the following functions: a spatial multiplex function, a soft reuse function, and a frequency reuse function; and
executing a radio resource manager, wherein the radio resource manager performs at least in part the allocation of access to the multi-mode modem for communication using the at least two modes, wherein the at least two modes use at least two frequency bands, and wherein the at least two frequency bands are overlapping.

27. The method recited in claim 26, wherein the multi-mode communication unit allocates access for wireless communication using the at least two modes comprises coordinating a radio resources assignment.

28. A computer program product, the computer program product being embodied in a non-transitory computer readable storage medium and comprising computer instructions for:
- executing a multi-mode communication function, wherein the multi-mode communication function allocates access for wireless communication using at least two modes; and wherein the multi-mode communication function allocates access for wireless communication using the at least two modes comprises coordinating a radio resources assignment by assigning subcarriers such that overlapped subcarriers of a first overlapping mode will not be assigned data by a second overlapping mode;
- executing a radio resource manager, wherein the radio resource manager performs at least in part the allocation of access for communication using the at least two modes; and
- executing a protocol management unit, wherein the protocol management unit performs at least in part the allocation of access for communication using the at least two modes,
- wherein the access is dynamically allocated between at least two multi-mode air interfaces of a multi-mode communication unit based on one or more of the following functions: a spatial multiplex function, a soft reuse function, and a frequency reuse function, wherein the at least two modes use at least two frequency bands, wherein the at least two frequency bands are overlapping.

29. The computer program product recited in claim 28, wherein the multi-mode communication unit allocates access for wireless communication using the at least two modes comprises coordinating a radio resources assignment.

* * * * *